(12) United States Patent
Kikuchi

(10) Patent No.: US 7,602,436 B2
(45) Date of Patent: Oct. 13, 2009

(54) LENS APPARATUS

(75) Inventor: Takayuki Kikuchi, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 587 days.

(21) Appl. No.: 11/133,778

(22) Filed: May 19, 2005

(65) Prior Publication Data
US 2005/0275743 A1 Dec. 15, 2005

(30) Foreign Application Priority Data
Jun. 9, 2004 (JP) ............................ 2004-170667

(51) Int. Cl.
*H04N 5/232* (2006.01)
*H04N 5/222* (2006.01)
*H04N 5/228* (2006.01)

(52) U.S. Cl. .................. 348/345; 348/349; 348/333.07; 348/208.12

(58) Field of Classification Search .................. 348/335, 348/207.99, 345, 333.01, 208.12, 326, 231.7, 348/333.07, 745, 346, 349
See application file for complete search history.

(56) References Cited

U.S. PATENT DOCUMENTS

| | | | | |
|---|---|---|---|---|
| 4,212,523 A | | 7/1980 | Yamada | |
| 4,591,919 A | * | 5/1986 | Kaneda et al. | 348/348 |
| 4,950,054 A | * | 8/1990 | Wada et al. | 359/684 |
| 4,974,002 A | * | 11/1990 | Ohnuki et al. | 396/95 |
| 5,144,491 A | * | 9/1992 | Ushiro et al. | 359/697 |
| 5,506,401 A | | 4/1996 | Segawa | |
| 5,528,331 A | | 6/1996 | Kusaka | |
| 5,765,051 A | * | 6/1998 | Watanabe | 396/87 |
| 5,786,589 A | | 7/1998 | Segawa | |
| 5,946,504 A | * | 8/1999 | Hirasawa et al. | 396/80 |
| 6,094,223 A | * | 7/2000 | Kobayashi | 348/354 |
| 6,433,824 B1 | * | 8/2002 | Tanaka et al. | 348/345 |
| 6,563,543 B1 | | 5/2003 | Doron | |
| 6,567,123 B1 | | 5/2003 | Hashimoto | |
| 6,683,652 B1 | * | 1/2004 | Ohkawara et al. | 348/347 |
| 6,812,969 B2 | * | 11/2004 | Ide et al. | 348/346 |
| 6,885,819 B2 | * | 4/2005 | Shinohara | 396/127 |
| 6,972,799 B1 | * | 12/2005 | Hashimoto | 348/350 |
| 6,992,720 B2 | * | 1/2006 | Kaneda | 348/363 |
| 7,248,301 B2 | * | 7/2007 | Voss et al. | 348/346 |
| 7,248,796 B2 | * | 7/2007 | Triteyaprasert et al. | 396/147 |
| 7,412,159 B2 | * | 8/2008 | Ichimiya | 396/104 |
| 2002/0109784 A1 | * | 8/2002 | Suda et al. | 348/345 |
| 2002/0154240 A1 | * | 10/2002 | Tamai et al. | 348/345 |
| 2002/0154909 A1 | * | 10/2002 | Yamazaki et al. | 396/125 |
| 2002/0171750 A1 | * | 11/2002 | Kato | 348/345 |
| 2002/0191099 A1 | * | 12/2002 | Okisu et al. | 348/345 |
| 2003/0174230 A1 | | 9/2003 | Ide et al. | |
| 2004/0090546 A1 | | 5/2004 | Doron | |
| 2004/0095504 A1 | * | 5/2004 | Yasuda | 348/345 |

(Continued)

FOREIGN PATENT DOCUMENTS

EP 0352778 A2 1/1990

(Continued)

*Primary Examiner*—Tuan Ho
*Assistant Examiner*—Marly Camargo
(74) *Attorney, Agent, or Firm*—Canon U.S.A., Inc. I.P. Division

(57) ABSTRACT

A lens apparatus is provided that is capable of more accurate Auto Focusing (AF) operating by representing a delay time in a camera unit using an AF evaluating value.

14 Claims, 15 Drawing Sheets

U.S. PATENT DOCUMENTS

| | | | |
|---|---|---|---|
| 2004/0227842 A1* | 11/2004 | Yoshikawa et al. | 348/345 |
| 2007/0291159 A1* | 12/2007 | Yamazaki et al. | 348/363 |
| 2008/0074531 A1* | 3/2008 | Ide et al. | 348/346 |

FOREIGN PATENT DOCUMENTS

| | | | |
|---|---|---|---|
| EP | 0352778 A3 | 1/1990 |
| EP | 0434981 A | 7/1991 |
| EP | 762742 A2 | 3/1997 |
| EP | 1398832 A2 | 3/2004 |
| EP | 1398832 A3 | 9/2004 |
| JP | 60-059878 A | 4/1985 |
| JP | 7-099214 A | 4/1995 |
| JP | 2000-330009 A | 11/2000 |
| JP | 2004-096638 A | 3/2004 |
| JP | 2004-112529 A | 4/2004 |

* cited by examiner

LENS APPARATUS

BACKGROUND OF THE INVENTION

1. Field of the Invention

The present invention relates generally to a lens apparatus and particularly but not exclusively to a lens apparatus using autofocus detection.

2. Description of the Related Art

Conventionally, an autofocus detection (referred to as AF below) control system has been essential in an image capturing apparatus such as a general-use video camera. In conventional lens apparatuses employing such AF systems (e.g. European Patent Publication No. EP-A2-762742), can be a signal can be extracted from captured images and evaluated in accordance with a sharpness of an object so as to detect a focal point of an optical system.

Conventional lens apparatuses employing the above-mentioned AF system are shown in FIGS. 14 and 15.

First, the conventional lens apparatus shown in FIG. 14 will be described.

Referring to FIG. 14, reference numeral 11 denotes an interchangeable lens unit; numeral 200 a camera; and numeral 300 a coaxial cable. In the camera 200, a process unit 1202 processes an output signal from a CCD 1201 and formats it to an National Television System Committee (NTSC) signal. A record reproducing unit 1203 records an image signal produced from the process unit 1202 on a recording medium. An output switching unit 1204 selects an image signal output from the process unit 1202 and the record reproducing unit 1203. An image output terminal 1205 outputs an image signal received from the output switching unit 1204.

In the lens unit 11, an image input terminal 1100 receives an image signal (e.g., via a coaxial cable 300). An evaluation value producing unit 1101 extracts a sharpness evaluation value 1111 from the image signal received from the image input terminal 1100. An AF drive controller 1102 produces a motor control signal, where the motor control signal is configured to maximize the sharpness evaluation value 1110 produced in the evaluation value producing unit 1101. A motor 1103 is controlled from the AF drive controller 1102, and a focus lens 1104 is moved in an optical axial direction by the driving of the motor 1103.

Operation of the conventional lens apparatus system of FIG. 14 will be described.

A beam passed through a focus lens 1104 forms an image on an image capturing surface of the CCD 1201, which in turn enters the process unit 1202 by sample-holding after being photo-electrically converted. In the process unit 1202, an input signal is processed to an image format such as the NTSC signal so as to be sent to the output switching unit 1204 and the record reproducing unit 1203.

During image recording, in the output switching unit 1204, the output of the process unit 1202 can be received by the image output terminal 1205, and the record reproducing unit 1203 records the output of the process unit 1202 on a recording medium.

During reproducing, the record reproducing unit 1203 reproduces the image signal recorded on a recording medium, and when the image signal is stably reproduced, the output switching unit 1204 outputs the image signal of the record reproducing unit 1203 to the image output terminal 1205.

To the image input terminal 1100 of the lens unit 11, an image signal is received from the image output terminal 1205 of the camera 200 via the coaxial cable 300. The image signal received in the image input terminal 1100 is filtered in the evaluation value producing unit 1101. The filtering produces a sharpness evaluation value, related to image frequency components in a vertically synchronized cycle unit of the image signal, which is sent to the AF drive controller 1102. In the AF drive controller 1102, a motor control signal is produced so as to move the focus lens 1104 to a position where the sharpness evaluation value 1111 is increased. The motor control signal is created by sequentially comparing, sharpness evaluation value 1111 in a vertically synchronizing cycle unit, the sharpness evaluation value 1111 to the required motor motion to increase the sharpness evaluation value 1111. The motor 1103 is driven by the motor control signal, thereby moving the focus lens 1104 to an in-focus point.

An example of a conventional AF driving operation will be described. First, it is determined whether the in-focus point is located at a position remote from or close to the present position of the focus lens 1104 by evaluating changes in sharpness evaluation value 1111 when the focus lens 1104 is slightly moved. This in turn determines a driving direction. Then, in order to detect the peak value of the sharpness evaluation, the focus lens 1104 is moved according to the determination result of the driving direction at a certain speed. This is referred to as a mountain-climbing determination. After the peak value is passed, by reversing the driving direction, the focus lens 1104 is moved in very small increments so as to increase the sharpness evaluation value 1111. This is referred to as a peak determination. After the peak determination, the sharpness evaluation value 1111 is compared with the value directly after the peak determination, so that when the value changes, the AF operation is restarted.

Next, the conventional lens apparatus shown in FIG. 15 will be described.

Referring to FIG. 15, reference numeral 11 denotes an interchangeable lens unit; numeral 210 a camera; and numeral 300 the coaxial cable.

In the camera 210, the process unit 1202 processes an output signal from the CCD 1201 and formats it to an NTSC signal. An image capturing/reproducing switching input unit 1206 establishes the operation of the camera 210 in an image capturing mode or a reproducing mode. The record reproducing unit 1203 determines whether to reproduce the image signal recorded on a recording medium depending upon the mode of the image capturing/reproducing switching input unit 1206. An output switching unit 1204 selects an image signal output from the process unit 1202 and the record reproducing unit 1203, the image signal affected by the mode of the image capturing/reproducing switching input unit 1206. The image output terminal 1205 receives the image signal from the output of the output switching unit 1204.

In the lens unit 11, the image input terminal 1100 receives an image signal via the coaxial cable 300, and the evaluation value producing unit 1101 extracts a sharpness evaluation value 1111 from the image signal received by the image input terminal 1100. The AF drive controller 1102 produces a motor control signal so as to maximize the sharpness evaluation value 1111 produced in the evaluation value producing unit 1101. The motor 1103 is controlled from the AF drive controller 1102, where the motor 1103 drives the movement of the focus lens 1104 in an optical axial direction.

Operation of the conventional lens apparatus shown in FIG. 15 will be described.

A beam passed through the focus lens 1104 forms an image on an image capturing surface of the CCD 1201, which is photo-electrically converted and stored, the stored Value entering the process unit 1202. In the process unit 1202, an input signal is processed to an image format such as the NTSC signal so as to be sent to the output switching unit 1204 and the record reproducing unit 1203.

Operations in the output switching unit 1204 and the record reproducing unit 1203 follow the mode of the image capturing/reproducing switching input unit 1206. That is, during image capturing, the output switching unit 1204 sends the output of the process unit 1202 to the image output terminal 1205.

During reproducing, the record reproducing unit 1203 reproduces the image signal recorded on a recording medium, and when the image signal is stably reproduced, the output switching unit 1204 sends the image signal of the record reproducing unit 1203 to the image output terminal 1205.

The image input terminal 1100 of the lens unit 11, receives an image signal from the image output terminal 1205 of the camera 210 via the coaxial cable 300. The image signal received in the image input terminal 1100 is filtered in the evaluation value producing unit 1101. The filtering produces a sharpness evaluation value 1111, related to image frequency components in a vertically synchronizing cycle unit of the image signal, which is sent to the AF drive controller 1102. In the AF drive controller 1102, a motor control signal is produced so as to move the focus lens 1104 to a position where the sharpness evaluation value 1111 is maximized. The motor control signal is created by sequentially comparing, in a vertically synchronizing cycle unit, the sharpness evaluation value 1111 to the required motor motion to increase the sharpness evaluation value 1111. The motor 1103 is driven, by the motor control signal, thereby moving the focus lens 1104 to an in-focus point.

According to the conventional lens apparatus shown in FIG. 14, the sharpness evaluation value 1111 is produced by the CCD 1201 and the process unit 1202 after the focus lens 1104 is driven. However a delay is generated between the measured sharpness evaluation value 1111 and the corresponding focus lens position.

In order to overcome such a delay, during the direction determination, it is necessary to use a sharpness evaluation value 1111 entered for use in the determination after the focus lens 1104 is very slightly moved in view of the delay in time. Such an attention to the delay in time may also be necessary during the peak determination.

As described above, in the conventional lens apparatus, the time delay in the AF operation is required in order to achieve a camera unit capable of the AF operation whenever the lens 100 is replaced. However the delay time of the camera 200 (210) cannot be uniquely established. As the digitalization of the camera 200 (210) further progresses, additional delay contributors (e.g. memory), may exist inside the process unit 1202, and the additional time delay contributors can vary depending on the camera model. Thus, making it difficult to more accurately reflect the delay time differences related to AF operation in various camera models.

According to the conventional lens apparatus shown in FIG. 15, because the image capturing/reproducing modes are not communicated between the lens unit 11 and the camera 210, even when the camera 210 is in the reproducing mode, the lens unit 11 is AF-operated for the received reproducing image.

As a result, the focus lens 1104 is driven so as to consume electric power in vain. As a countermeasure, the image capturing/reproducing modes may communicate between the lens unit 11 and the camera 200 in the content a special communication; however, in order to achieve a camera unit capable of the AF operation, whenever the lens unit 11 is replaced, it is difficult to control the accuracy of the content of the special communication of the image capturing/reproducing modes.

SUMMARY OF THE INVENTION

At least one exemplary embodiment provides a lens apparatus, having a lens assembly detachable from a camera, capable of AF operation by facilitating the production of an AF evaluation value to more accurately reflect a delay time due to the camera. Also it provides a lens apparatus capable of inhibiting lens driving due to AF operation when the camera can be in a reproducing mode.

A lens apparatus according to a first aspect of the present invention provides for driving a focus lens driver, using an image signal. The lens apparatus can be arranged detachably with a camera apparatus, and can include an optical system having a focus lens. Additionally the lens apparatus can include: an evaluation value producing unit for producing an evaluation value for detecting an autofocus point using the image signal produced from the camera apparatus; a focus lens drive signal producing unit for producing a focus lens drive signal using the evaluation value; and a delay time measuring unit measuring a delay time between when the image signal from the camera apparatus is received by the lens.

The delay time measuring unit may measure the delay time from the time when an emission signal is changed due to the output of an emission controller. The emission controller controls an emission unit for feeding light to the optical system. The light is fed only for a predetermined period of time when a luminance signal is changed due to the determination result of a luminance signal determination unit. Where the luminance signal determination unit determines the luminance of the image signal produced from the camera apparatus having a predetermined threshold value.

The delay time measuring unit may measure a delay time from the time when the position of the optical system is changed by a controller. Where the controller controls a drive unit, which moves the position of the optical system, when evaluation value information is changed due to the determination result of an evaluation value determination unit. The evaluation value determination unit determines a variation in evaluation value for detecting the autofocus point.

A lens apparatus according to a second aspect of the present invention for driving a focus lens driver. The lens apparatus can use an image signal and can be arranged detachably with a camera apparatus. The lens apparatus can include: an evaluation value producing unit for producing an evaluation value for detecting an autofocus point using the image signal produced from the camera apparatus; a focus lens drive signal producing unit for producing a focus lens drive signal using the evaluation value produced from the evaluation value producing unit; and a controller that facilitates the focus lens drive signal to enter the focus lens driver during driving of the focus lens driver when the camera apparatus is in an image capturing mode while inhibiting the focus lens drive signal to enter the focus lens driver when the camera apparatus is in an image reproducing mode.

In at least one further exemplary embodiment the lens apparatus may further include an inputting unit for establishing the camera apparatus in one of the modes of image capturing and/or image reproducing.

In at least one exemplary embodiment the lens apparatus may further include a camera mode determination unit for determining the camera apparatus whether in an image capturing mode or in an image reproducing mode, where the camera mode determination unit may include: a synchronizing-signal extraction unit for extracting a horizontally or vertically synchronizing signal from the image signal entered from an image producing unit; a reference timing generating unit for generating a reference timing; and a synchronizing-signal quality determination unit for determining the quality of the synchronizing signal extracted by the synchronizing-signal extraction unit using the reference timing generated from the reference timing generating unit. When the synchronizing-signal quality determination unit determines the quality to be high, the camera apparatus may be determined to be in the image capturing mode, and when determining the quality to be low, the camera apparatus may be determined to be in the image reproducing mode.

At least one exemplary embodiment of the lens apparatus may further include: a camera mode determination unit for determining whether the camera apparatus is in the image capturing mode or in the image reproducing mode, the camera mode determination unit includes a correlation determination unit for determining the correlation between the evaluation value and position information by inputting the evaluation value outputted from the evaluation value producing unit and the position information of the focus lens obtained from the focus lens drive signal producing unit. When the correlation determination unit determines the correlation to be high, the camera apparatus may be determined to be in the image capturing mode, and when determining the correlation to be low, the camera apparatus may be determined to be in the image reproducing mode.

In at least one exemplary embodiment the focus lens drive signal producing unit may include a focus lens stop signal generating unit for stopping the focus lens when the focus lens reaches an in-focus point; an in-focus point information storing unit for storing an in-focus point sharpness evaluation value 1111 at the in-focus point and in-focus point position information of the focus lens; a restart determination unit for determining the present evaluation value for detecting the autofocus point and the in-focus point sharpness evaluation value 1111 with a restart threshold value; an autofocus restarting unit for restarting an autofocus processing according to the determined result of the restart determination unit; a restart initial value storing unit for storing a restart initial sharpness evaluation value 1111 before the focus lens is driven when the restart determination unit is operated and the focus lens is moved by the focus lens driver; a sharpness evaluation value variation calculating unit for calculating the amount of change between the restart initial sharpness evaluation value 1111 stored in the restart initial value storing unit and the evaluation value for detecting the autofocus point; a focus lens position variation calculating unit for calculating the amount of change between the in-focus point position information stored in the in-focus point information storing unit and the present focus lens position information; and an evaluation value/lens position correlation determining unit for determining the correlation between the results of the sharpness evaluation value variation calculating unit and the focus lens position variation calculating unit, where the focus lens drive signal may be controlled based on the result of the evaluation value/lens position correlation determining unit.

In at least one exemplary embodiment the focus lens drive signal producing unit may include a focus lens stop signal generating unit for stopping the focus lens when the focus lens reaches an in-focus point; an in-focus point information storing unit for storing an in-focus point sharpness evaluation value 1111 at the in-focus point and in-focus point position information of the focus lens; a restart determination unit for determining the present evaluation value for detecting the autofocus point and the in-focus point sharpness evaluation value 1111 with a restart threshold value; an autofocus restarting unit for restarting an autofocus processing according to the determined result of the restart determination unit; a lens cycle change unit for periodically changing the focus lens position by the controller when it is determined from the result of a camera mode determination unit that the mode of the camera is changed from the image capturing mode to the image reproducing mode; a correlation confirmed information storing unit for storing the position information of the focus lens and the sharpness evaluation value 1111; a periodical evaluation value/lens position correlation determining unit for determining the correlation between the sharpness evaluation value 1111 stored in the correlation confirmed information storing unit, the position information of the focus lens, and the evaluation value for detecting the autofocus point. When an increased correlation is determined by the periodical evaluation value/lens position correlation determining unit, the autofocus restarting unit may determine that the camera changes mode from the image reproducing mode to the image capturing mode, restarting the autofocus processing.

In at least one exemplary embodiment, the focus lens drive signal producing unit may include a focus lens stop signal generating unit for stopping the focus lens when the focus lens reaches an in-focus point; an in-focus point information storing unit for storing an in-focus point sharpness evaluation value 1111 at the in-focus point and in-focus point position information of the focus lens; a restart determination unit for determining the present sharpness evaluation value 1111 and the in-focus point sharpness evaluation value 1111 with a restart threshold value; and an autofocus restarting unit for restarting an autofocus process by using the restart determination unit. The restart determination unit determines the evaluation value for detecting an autofocus point with an image-capturing returning threshold value when it is determined by the result of a camera mode determination unit that the mode of the camera apparatus is changed from the image capturing mode to the image reproducing mode.

In at least one exemplary embodiment, the lens apparatus may further include an evaluation value information storing unit for storing an evaluation value for detecting the autofocus point; an evaluation value calculating unit for calculating the evaluation value stored in the evaluation value information storing unit and the present evaluation value for detecting the autofocus point; and an autofocus restarting unit for restarting an autofocus process by using the restart determination unit, which determines the result of comparison of values by the evaluation value calculating unit with an image-capturing returning threshold value.

When an increased correlation is determined by the periodical evaluation value/lens position correlation determining unit, which drives the lens cycle change unit after the determined result of an image-capturing returning threshold value determines to restart the autofocus processing, the autofocus restarting unit may determine that the mode of the camera apparatus changes from the image reproducing to the image capturing so as to restart the autofocus processing.

When an increased correlation is determined by the periodical evaluation value/lens position correlation determining unit, which drives the lens cycle change unit after the determined result of the image-capturing returning threshold value determines to restart the autofocus processing, the autofocus restarting unit may determine that the mode of the camera apparatus changes from the image reproducing mode to the image capturing mode, restarting the autofocus processing.

In at least one exemplary embodiment the lens apparatus may further include a camera mode determination unit for determining whether the mode of the camera apparatus is in whether the image capturing mode or image reproducing mode, the camera mode determination unit having a synchronizing-signal quality determination unit and a correlation determination unit so as to determine whether the camera mode is in image capturing or image reproducing from the determined results from both the units.

In at least one exemplary embodiment the lens apparatus may further include a lens operation inputting unit for a lens to be operated by a user; and a lens operation inputting determination unit for determining the presence of the inputting of the lens operation inputting unit. When the lens operation inputting determination unit determines variation in the inputting by the lens operation inputting unit, the lens operation inputting determination unit may determine that the mode of the camera apparatus changes from the image reproducing mode to the image capturing mode, restarting the autofocus processing.

In at least one exemplary embodiment the lens apparatus may further include a lens position displacement unit for detecting the moving direction of the focus lens, which can occur when displacing the focus lens during autofocus operation, where the lens position displacement unit may displace the focus lens independently from the cycle and the movement of a lens cycle change unit.

In at least one exemplary embodiment an image capturing apparatus includes: the lens apparatus according to at least one exemplary embodiment and a camera apparatus to be mounted on the lens apparatus.

Further features and advantages of at least several exemplary embodiments will become apparent from the following description of exemplary embodiments with reference to the attached drawings.

DESCRIPTION OF THE EMBODIMENTS

Figure 1:
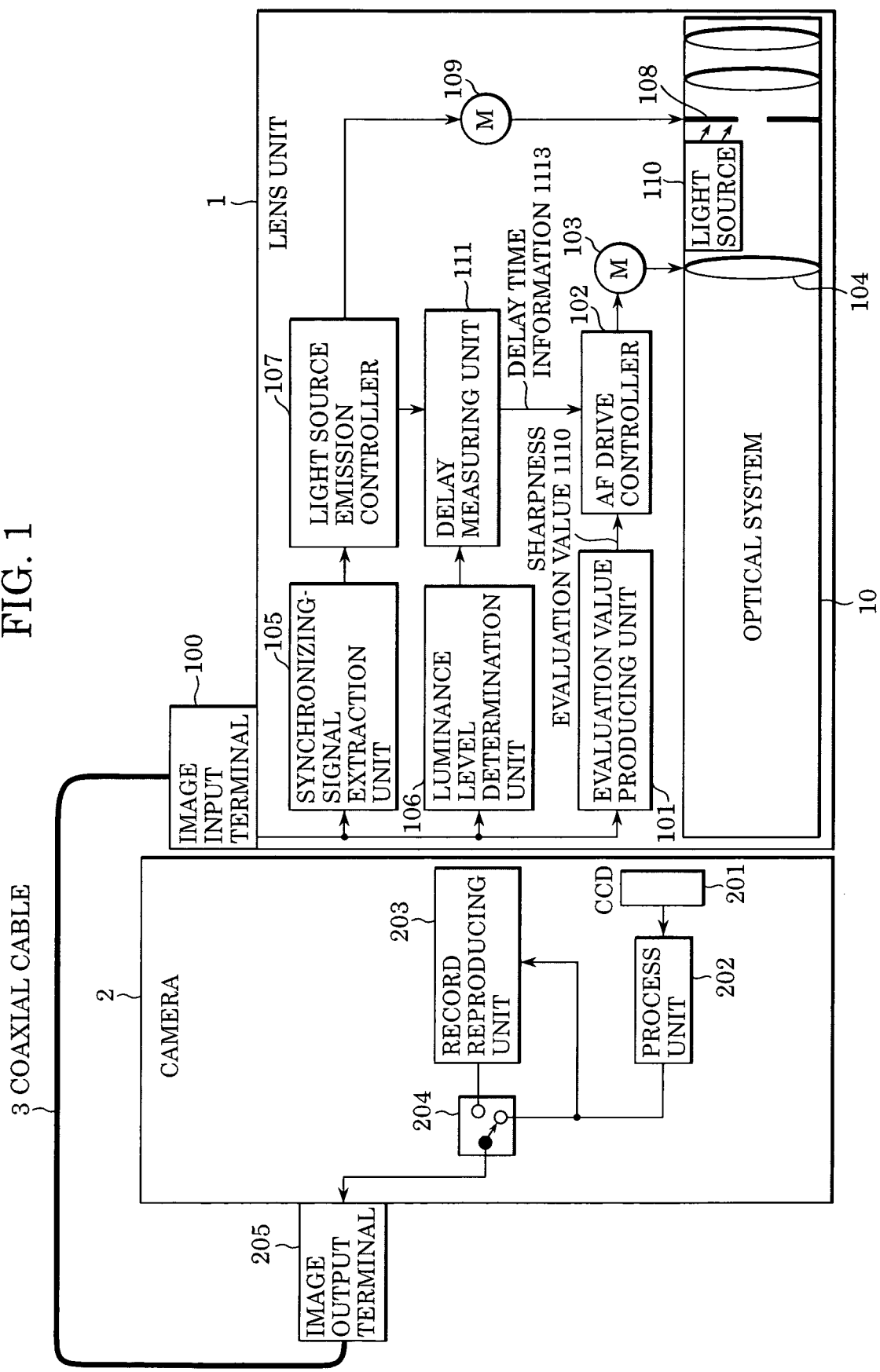
FIG. 1 illustrates a block diagram of a lens apparatus according to ate least one exemplary embodiment.

The following description of exemplary embodiments is merely illustrative in nature and is in no way intended to limit the invention, its application, its equivalents, or uses.

Processes, techniques, apparatus, and materials as known by one of ordinary skill in the art may not be discussed in detail but are intended to be part of the enabling description where appropriate. For example lens and lens units are discussed and any material that can be used to form lenses should fall within the scope of exemplary embodiments (e.g. glass, Si). Additionally the actual size of the lens may not be discussed however any size from macro lenses to micro and nano lenses are intended to lie within the scope of exemplary embodiments (e.g. lenses with diameters of nanometer size, micro size, centimeter, and meter sizes). Additionally exemplary embodiments are not limited to visual optical photographic systems, for example the system can be designed for use with infrared and other wavelengths systems.

Additionally although the Figures (e.g., FIG. 1) illustrate particular exemplary embodiments having a co-axial cable 3 to communicate signals between an image output terminal 205 and an image input terminal 100, at least one exemplary embodiment includes the situation where the lens unit 1 is operatively connected to the camera 2, such that no co-axial cable 3, and/or no image output terminal 205, and/or no image input terminal 100 are needed.

Embodiments according to at least several exemplary embodiments will be further described below.

According to at least one exemplary embodiment, an apparatus having a lens apparatus and a camera apparatus can be defined as an image capturing apparatus.

At Least a First Exemplary Embodiment

In at least one exemplary embodiment, an autofocus lens apparatus is operatively connected (e.g. arranged detachably) with a camera apparatus and includes an image inputting unit for inputting an image signal; a sharpness evaluation value producing unit for producing the sharpness evaluation value related to the image sharpness from the image signal received by the image inputting unit; a focus lens drive signal producing unit for producing a focus lens drive signal using the sharpness evaluation values produced from the sharpness evaluation value producing unit; and a focus lens driver for driving a focus lens using the focus lens drive signal produced from the focus lens drive signal producing unit.

The lens apparatus can have several internal units associated with various functional activity, for example the lens apparatus can include a light emitting unit for facilitating light entering an optical path; a luminance signal determination unit for determining the luminance of the image signal from the image inputting unit with a predetermined first threshold value; a light emission controller for facilitating the light emitting unit to emit light for a predetermined period of time; a delay time measuring unit for measuring the period from the time at which the light emission signal produced from the light emission controller can be changed until the time at which the luminance signal determination information outputted from the luminance signal determination unit can be changed; and a delay time storing unit for storing results of the delay time measuring unit, in which the focus lens drive signal producing unit uses the delay time stored in the delay time storing unit. Thereby, the delay time of the camera can be measured so as to send it to the AF drive processing.

Next, the specific structure will be further described with reference to the drawings.

FIG. 1 illustrates a block diagram of a lens apparatus according to at least one exemplary embodiment.

Referring to FIG. 1, reference numeral 1 denotes an interchangeable lens unit; numeral 2 a camera and numeral 3 a coaxial cable.

In the camera 2, a process unit 202 can process an output signal from a CCD 201 and format it to an NTSC signal (e.g. NTSC). A record reproducing unit 203 can determine whether an image signal recorded on a recording medium is reproduced or not. An output switching unit 204 can select one of the image signal outputs of either the process unit 202 and/or the record reproducing unit 203. An image output terminal 205 receives and/or produces the image signal from the output of the output switching unit 204.

In the lens unit 1, reference numeral 10 denotes an optical system, and an image input terminal 100 receives an image signal through the coaxial cable 3. An evaluation value producing unit 101 can extract a sharpness evaluation value 1110 from the image signal entered in the image input terminal 100. An AF drive controller 102 produces a motor control signal so as to increase the sharpness evaluation value 1110 produced in the evaluation value producing unit 101.

A focus motor 103 can be operated by the control from the AF drive controller 102, and a focus lens 104 can be moved in an optical axial direction by the driving of the focus motor (M) 103. A synchronizing-signal extraction unit 105 extracts a horizontally/vertically synchronizing signal from the image signal received by the image input terminal 100. A luminance level determination unit 106 determines the luminance level of the image signal received by the image input terminal 100.

The optical system 10 can include an iris 108, and an iris drive motor 109, which can open/close the iris 108. A light source 110 (e.g. an LED) can also be included in the optical system 10. A light source emission controller 107 controls the emitting timing of the light source 110 at a cycle of the synchronizing signal from the synchronizing-signal extraction unit 105. A delay measuring unit 111 measures the time until between changes of the determination signal, which is the output of the luminance level determination unit 106.

Then, the operation of the lens apparatus according to the exemplary embodiment illustrated in FIG. 1, will be described.

By way of an initialization process, the lens unit 1 is started, while closing the power supply to the camera 2. Then, the delay time when the image entered the CCD 201 of the camera 2 and when it is received by the image input terminal 100 is measured.

In at least one exemplary embodiment, the light source emission controller 107 can close the iris 108 by driving the iris motor 109. An emission control signal (not shown), which causes the light source 110 to emit light simultaneously with a synchronizing signal obtained from the synchronizing-signal extraction unit 105 for a one-frame period of time, can be sent to the light source 110 and the delay measuring unit 111. The delay measuring unit 111 receives this emission control signal so as to initiate a timer operation with the synchronizing signal as a reference. On the other hand, the light source 110 emits light toward the iris 108, the iris having been closed according to the emission control signal, which reflects the light, the reflected light arriving at the CCD 201.

In at least one exemplary embodiment, a luminance level determination unit 106 determines the luminance level according to a predetermined threshold value so as to feed the result to the delay measuring unit 111. The delay measuring unit 111 can feed a timer value to the AF drive controller 102 as delay time information 1113. The delay measuring unit 111 can also terminate the timer operation when luminance level information is changed from a dark level by the influence of the emission of the light source 110. In the AF drive controller 102, this delay time information 1113 can be stored in a nonvolatile memory such as a flash memory while being used as a delay time parameter of AF operation algorithm.

After the termination of such an initialization process, a normal AF operation can be performed. To the image input terminal 100 of the lens unit 1, an image signal can be received from the image output terminal 205 of the camera 2 via a conduit (e.g. a coaxial cable 3). The image signal entered in the image input terminal 100 can be filtered in the evaluation value producing unit 101 so as to produce a sharpness evaluation signal relating to image frequency components in a vertically synchronizing cycle unit of the image signal to the AF drive controller 102. In the AF drive controller 102, a motor control signal can be produced so as to move the focus lens 104 to a position where the sharpness evaluation value 1110 can be increased by sequentially comparing the sharpness evaluation value 1110 in a vertically synchronizing cycle unit while the motor 103 is driven, thereby moving the focus lens 104 to an in-focus point through driving the motor 103.

A driving example, in accordance with at least one exemplary embodiment, of the AF drive controller 102 at this time will be described. First, it is determined whether the in-focus point is located at a position remote from or close to the present position of the focus lens 104 by changes in sharpness evaluation value 1110 when the focus lens 104 is slightly moved. The driving direction can be determined by the change in the sharpness evaluation value 1110. The a value for the sharpness evaluation value 1110 used for the change determination can be an elapsed time given by a delay time parameter obtained at the initialization from the time when the focus lens is driven. Then, in order to detect the peak value of the sharpness evaluation, the focus lens 104 can be moved according to the determination result of the driving direction at a certain speed. This can be referred to as a mountain-climbing determination. After the peak value is passed, by reversing the driving direction, the focus lens 104 can be moved in very small increments so as to increase the sharpness evaluation value 1110. This can be referred to as a peak determination.

Also, in peak determination, after the focus lens 104 is moved, the determination can be made using the sharpness evaluation value 1110 obtained after the elapsed time given by a delay time parameter obtained at the initialization. After the peak determination, the sharpness evaluation value 1110 can be read so as to compare it with the sharpness evaluation value 1110 value directly after the peak determination, so that when the sharpness evaluation value 1110 value is changed, the AF operation can be restarted.

In at least one exemplary embodiment, even when the lens unit 1 is mounted on the camera 2 of a model having different delay in image signal, the AF operation can be performed.

At Least a Second Exemplary Embodiment

At least a second exemplary embodiment of, an autofocus lens apparatus, operatively connected (e.g. arranged detachably) with a camera apparatus, includes an image inputting unit for inputting an image signal; a sharpness evaluation value producing unit for producing the sharpness evaluation value 1110 showing the image sharpness from the image signal received by the image inputting unit; a focus lens drive signal producing unit for producing a focus lens drive signal using the sharpness evaluation value 1110s produced from the sharpness evaluation value producing unit; and a focus lens driver for driving a focus lens using the focus lens drive signal, there can be an optical system driver for changing the mode of an optical system including: the focus lens; an optical system drive controller for controlling the optical system driver; a sharpness evaluation value determination unit for determining the variation of the sharpness evaluation value 1110; a delay time measuring unit for measuring the period from the time at which the optical system mode is changed by the optical system drive controller until the time at which the sharpness evaluation value 1110 information outputted from the sharpness evaluation value determination unit is changed; and a delay time storing unit for storing results of the delay time measuring unit, in which the focus lens drive signal producing unit uses the delay information stored in the delay time storing unit and the sharpness evaluation value 1110. Thereby, the delay time of the camera can be measured so as to reflect it to the AF drive processing with a software program without hardware added thereto.

Next, the specific structure will be further described with reference to the drawings.

Figure 2:
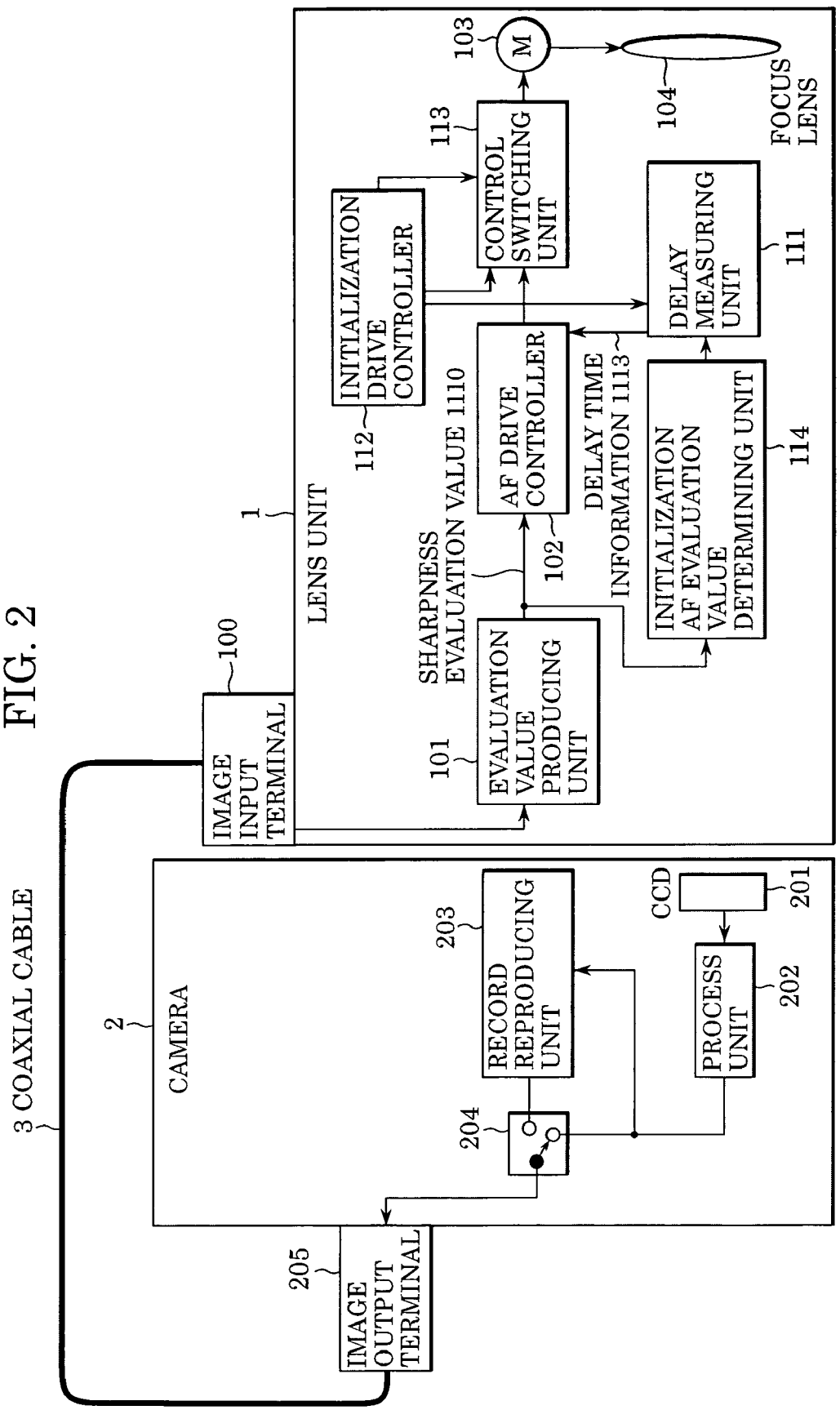
FIG. 2 illustrates a block diagram of a lens apparatus according to at least one additional exemplary embodiment.

FIG. 2 illustrates a block diagram of a lens apparatus according to at least one exemplary embodiment.

Referring to FIG. 2, like reference numerals designate like components common to those of the first exemplary embodiment, and the description about the same operations can be omitted.

In the lens unit 1 shown in FIG. 2, an initialization drive controller 112 can be operated so as to feed the timer value to the AF drive controller 102 as delay time information 1113 directly after the power supply of the lens unit 1 is closed, and a control switching unit 113 selects a drive signal. The drive signal can be the output of the initialization drive controller 112 and/or the AF drive controller 102. The switching signal 1114 of the initialization drive controller 112 feeds the drive signal to the focus motor 103. An initialization AF evaluation value determination unit 114 produces delay time information 1113 by inputting a sharpness evaluation value 1110. A delay measuring unit 111 measures the delay of outputs from the initialization drive controller 112 and the initialization AF evaluation value determination unit 114.

Next, the operation of the lens apparatus according to the exemplary embodiment will be described.

The lens unit 1 can be started closing the power supply by the camera 2. Then, the delay time when the image focused on the CCD 201 of the camera 2 is received by the image input terminal 100 can be measured.

The initialization drive controller 112 can feed a switching signal 1114 to the control switching unit 113 as the initialization drive controller 112 controls the focus motor 103. Then, the initialization drive controller 112 feeds a drive control signal for moving the focus lens 104 by a predetermined distance to the focus motor 103 via the control switching unit 113. Then, it feeds a timer start signal to the delay measuring unit 111 at the timing of stopping the focus motor 103.

The initialization AF evaluation value determination unit 114 sequentially monitors the changing and convergence of the sharpness evaluation value 1110 obtained from the evaluation value producing unit 101, that occurs with the movement and stopping of the focus lens. At the time when the value converges, the initialization AF evaluation value determination unit 114 feeds a timer stop signal to the delay measuring unit 111. The delay measuring unit 111 feeds the obtained delay information to the AF drive controller 102. In the AF drive controller 102, this delay time information 1113 can be stored in a nonvolatile memory such as a flash memory while being used as a delay time parameter of AF operation algorithm.

Then, the initialization drive controller 112 feeds a switching signal 1114 to the control switching unit 113 so as to complete the initialization processing, while the AF drive controller 102 controls the focus motor 103.

In at least one exemplary embodiment, the AF operation can be performed with a software program without a dedicated circuit added thereto. According to the at least one exemplary embodiment, the sharpness evaluation value 1110 can be changed by the movement of the focus lens. Alternatively, an iris or a zoom, if they are provided, may be changed so as to change the sharpness evaluation value 1110.

At Least a Third Exemplary Embodiment

At least a third exemplary embodiment includes the lens apparatus according to the second exemplary embodiment, where there can be a manually-operated movable second focus lens and a back focus starting unit for starting the back focus adjustment. In at least one exemplary embodiment of a lens apparatus, the AF drive controller 102 starts controlling operatively in associated with the back focus starting unit, which produces back focus adjustments. Thereby, the sharpness evaluation value can be improved in accuracy and the delay time can be more accurately measured.

Next, the specific structure will be further described with reference to the drawings.

Figure 3:
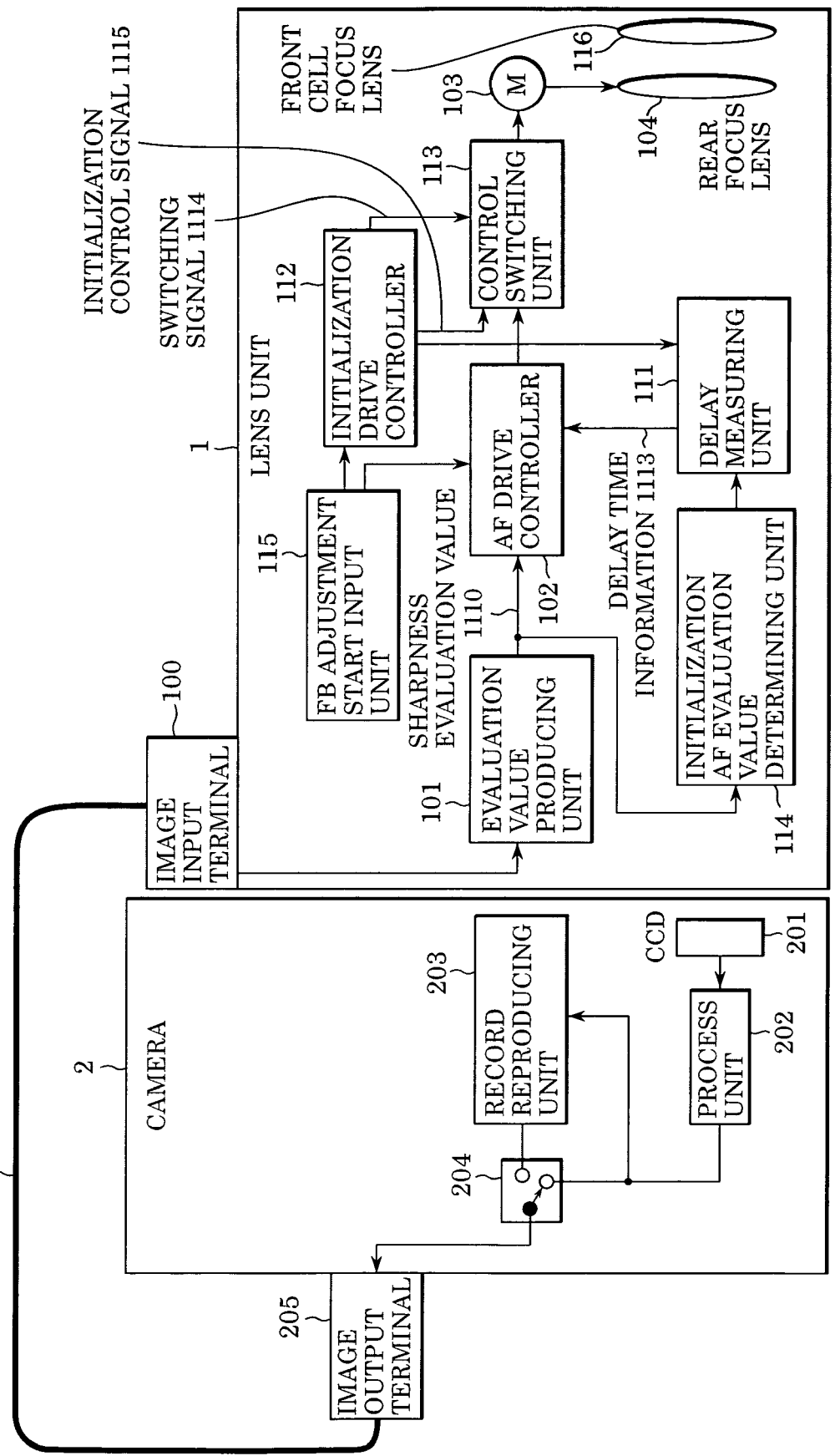
FIG. 3 illustrates a block diagram of a lens apparatus according to at least one additional exemplary embodiment.

FIG. 3 illustrates a block diagram of a lens apparatus according to an exemplary embodiment.

Referring to FIG. 3, like reference numerals designate like components common to those of the first exemplary embodiment, and the description about the same operations can be omitted.

At least one exemplary embodiment measures the delay time of the camera 2 during the back focus adjustment.

The back focus adjustment can be also referred to as the FB (frange back) adjustment, and can be adjust focusing at both telescopic and wide angle ends during zooming. In the normal rear focus lens unit 1, the movement distance of the rear focus lens includes a margin so that no adjustment is needed; however, in the lens unit 1 used as both AF and MF (manually focus), in which during AF, the rear focus lens is moved for focusing and during MF, the front cell focus lens is moved for focusing, the back focus adjustment can be mounted on the camera 2.

Referring to FIG. 3, reference numeral 115 denotes an FB adjustment starting unit, which can be initiated by a user for starting the FB adjustment; and numeral 116 denotes a front cell focus lens for manual focusing.

Figure 4:
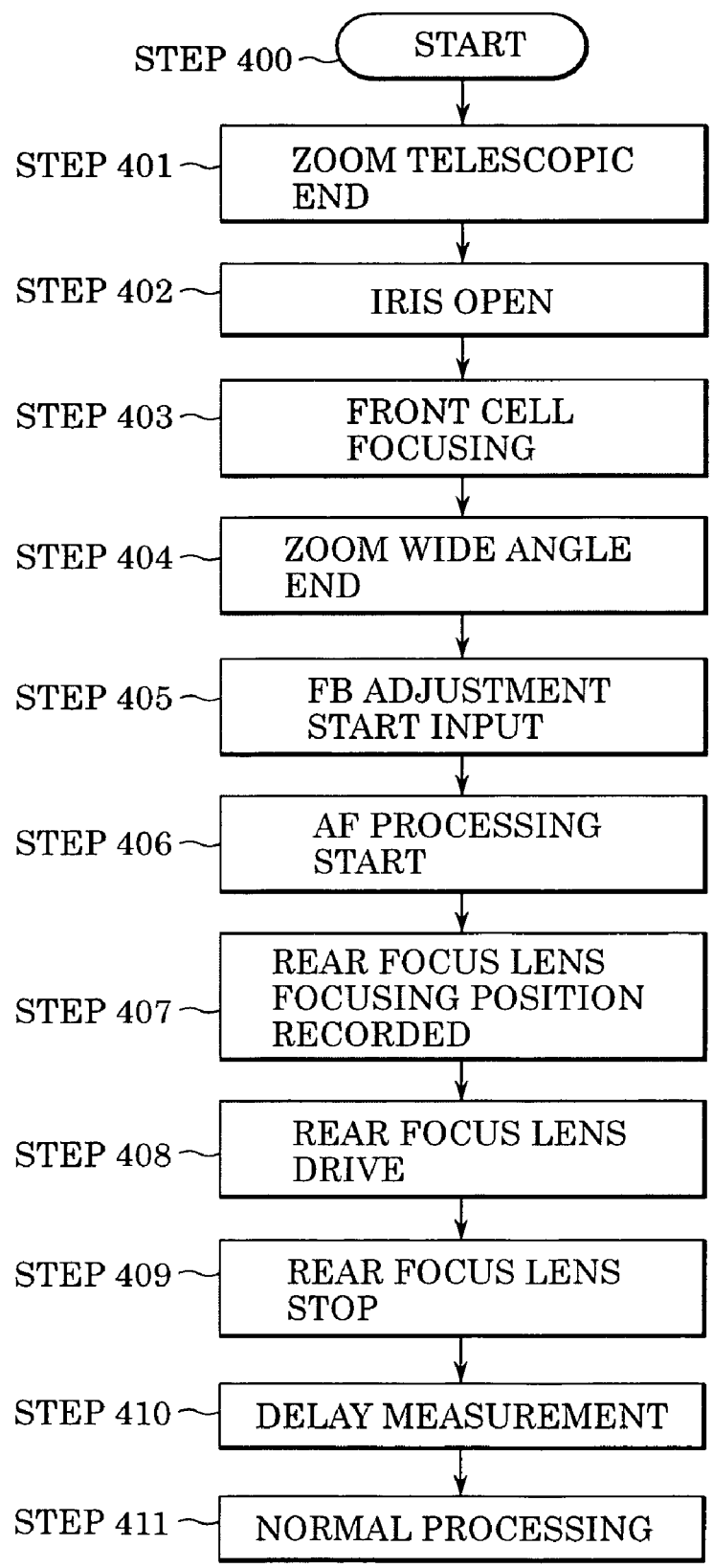
FIG. 4 illustrates a flowchart of FB adjustment according to at least one exemplary embodiment.

FIG. 4 illustrates a flowchart of the FB adjustment according to at least one exemplary embodiment.

First, a user manually sets the zoom position at the maximum telescopic distance (step 401); in a state where the iris can be opened (step 402), the front cell focus lens 116 can be adjusted for focusing on an object such as Siemens' star chart located at a position about 3 m apart (step 403).

Then, the zoom position can be set at the maximum wide angle distance (step 404) and a start command can be sent to the FB adjustment starting unit 115 (step 405).

The AF drive controller 102 initiates the AF processing upon receipt of the command from the FB adjustment starting unit 115 (step 406), where the focus lens 104 is moved to the in-focus point. In the AF drive controller 102, the position of the rear focus lens can be stored as an optical reference position (step 407) so as to complete the FB adjustment.

Then, the rear focus lens can be moved by a predetermined distance as controlled from the initialization drive controller 112 (step 408); thereafter, the rear focus lens can be further returned to the stored optical reference position. At the timing of returning the rear focus lens to the optical reference position, a timer start signal can be fed to the delay measuring unit 111 from the initialization drive controller 112.

The initialization AF evaluation value determination unit 114 sequentially monitors the changes and convergence of the sharpness evaluation value 1110 obtained from the evaluation value producing unit 101, which occur with the movement and stopping (step 409) of the focus lens. At the time when the value converges, the initialization AF evaluation value determination unit 114 feeds a timer stop signal to the delay measuring unit 111. The delay measuring unit 111 feeds the obtained delay information to the AF drive controller 102 (step 410).

In the AF drive controller 102, this delay time information 1113 can be stored in a nonvolatile memory such as a flash memory while being used as a delay time parameter of AF operation algorithm. Then, the initialization drive controller 112 feeds a switching signal 1114 to the control switching unit 113 so as to complete the initialization processing (step 411), while the AF drive controller 102 controls the rear focus motor 103.

By measuring the delay time of the camera during the FB adjustment, the sharpness evaluation value 1110 can be determined using an object with high spatial frequency, so that the delay time can be measured more accurately. According to at least one exemplary embodiment, because of the measurement with high accuracy due to the sensitive sharpness evaluation value 1110 in the vicinity of the in-focus point, the start timing of a delay measurement can be the position where the rear focus lens is positioned at the in-focus point. Alternatively, the rear focus lens may be stopped at an arbitrary position so as to select this time as the start timing. The sharpness evaluation value 1110 at the optical reference position obtained during the FB adjustment may also be stored so that the initialization AF evaluation value determination unit 114 compares the value with the sequentially entered sharpness evaluation value 1110 so as to feed the timer stop signal to the delay measuring unit 111 when the value substantially agrees therewith.

At Least a Fourth Exemplary Embodiment

At least a fourth exemplary embodiment of at a lens apparatus operatively connected (e.g. arranged detachably) with a camera apparatus and including: an image inputting unit for inputting an image signal; a sharpness evaluation value 1110 producing unit for producing the sharpness evaluation value 1110 showing the image sharpness from the image signal received by the image inputting unit; a focus lens drive signal producing unit for producing a focus lens drive signal by comparing the sharpness evaluation values 1110 produced from the sharpness evaluation value 1110 producing unit; and a focus lens driver for driving a focus lens using the focus lens drive signal. There can be a camera mode inputting unit where camera mode inputting information from the camera mode inputting unit is in an image capturing mode, the focus lens drive signal can be permitted to enter the focus lens driver. Alternatively, when the camera mode inputting information is in an image reproducing mode, the focus lens drive signal can be prohibited to enter the focus lens driver, and a drive inhibiting/permitting unit is used for stopping the focus lens.

Figure 5:
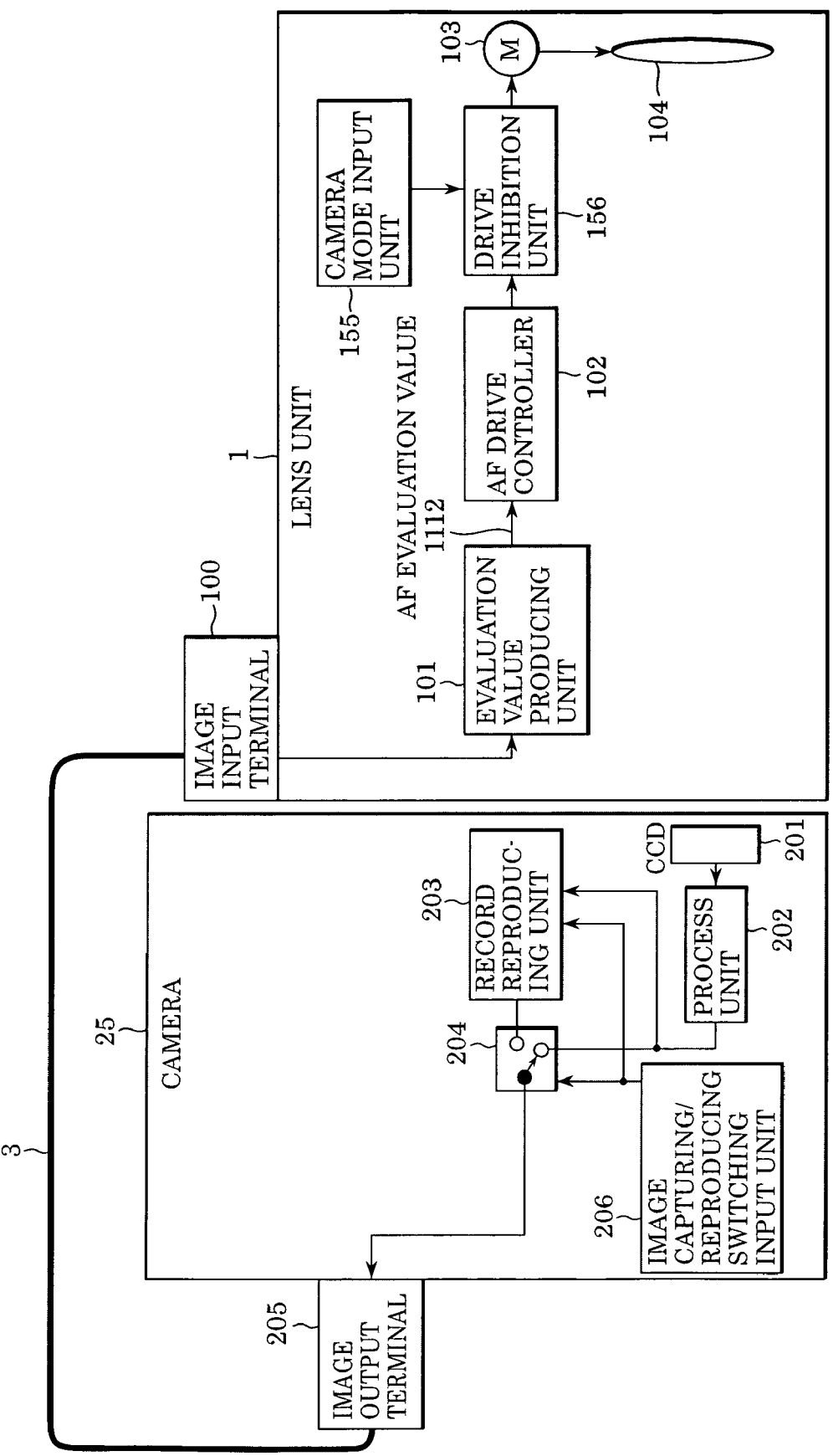
FIG. 5 illustrates a block diagram of a lens apparatus according to at least one additional exemplary embodiment.

FIG. 5 illustrates a block diagram of a lens apparatus according to at least one exemplary embodiment.

Referring to FIG. 5, like reference numerals designate like components common to those of the first exemplary embodiment, and the description about the same operations can be omitted.

In a camera 25, the process unit 202 can process an output signal from the CCD 201 and formats it to an NTSC signal. An image capturing/reproducing switching input unit 206 can establish the operating mode of the camera 25 to be an image capturing mode or reproducing mode. The record reproducing unit 203 can determine the image signal recorded on a recording medium to be reproduced or not so as to execute it. The output switching unit 204 can select one of the image signal outputs of the process unit 202 and the record reproducing unit 203 according to the mode of the image capturing/reproducing switching input unit 206 so as to be executed. The image output terminal 205 can receive the image signal outputted from the output switching unit 204.

In the lens unit 1, the image input terminal 100 can input an image signal (e.g. via the coaxial cable 3); and the evaluation value producing unit 101 can be for extracting a sharpness evaluation value 1112 from the image signal entered in the image input terminal 100. The AF drive controller 102 can produce a motor control signal so as to increase the sharpness evaluation value 1112 produced in the evaluation value producing unit 101. A camera mode input unit 155 can establish the mode of the camera 25 to be either the image capturing mode or the reproducing mode. A drive inhibiting unit 156 can be for inhibiting/permitting the control signal produced from the AF drive controller 102. The motor 103 can be controlled from the drive inhibiting unit 156. The focus lens 104 can be moved in an optical axial direction by the motor 103.

Then, the operation of the lens apparatus according to the at least one exemplary embodiment will be described.

A beam passed through the focus lens 104 forms an image on an image capturing surface of the CCD 201, which is photo-electrically converted and stored, the stored value entering the process unit 202.

In the process unit 202, an input signal can be processed to an image format such as the NTSC signal so as to be produced in the output switching unit 204 and the record reproducing unit 203. The output switching unit 204 and the record reproducing unit 203 operate according to the mode of the image capturing/reproducing switching input unit 206, respectively. That is, during image recording, in the output switching unit 204, the output of the process unit 202 can be received by an image output terminal 205. During reproducing, the record reproducing unit 203 reproduces the image signal recorded on a recording medium, and when the image signal can be stably reproduced, the output switching unit 204 outputs the image signal of the record reproducing unit 203 to the image output terminal 205.

To the image input terminal 100 of the lens unit 1, an image signal can be received from the image output terminal 205 of the camera 25 (e.g. via the coaxial cable 3).

When the camera 25 is in an image capturing mode, the camera mode input unit 155 can be established to be in the image capturing mode. According to the mode signal, the drive inhibiting unit 156 operates the motor to follow the control of the AF drive controller 102. That is, the image signal entered in the image input terminal 100 can be filtered in the evaluation value producing unit 101 so as to produce a sharpness evaluation signal related to image frequency components in a vertically synchronizing cycle unit of the image signal to the AF drive controller 102.

In the AF drive controller 102, a motor control signal can be produced so as to move the focus lens 104 to a position where the sharpness evaluation value 1110 can be increased by sequentially comparing the sharpness evaluation value 1110 in a vertically synchronizing cycle while the motor 103 can be driven, thereby moving the focus lens 104 to an in-focus point by driving the motor 103 via the drive inhibiting unit 106. When the camera 25 is in the image reproducing mode, the camera mode input unit 105 is established to be in the image reproducing mode. According to the mode signal, the drive inhibiting unit 106 operates the motor to be stopped.

By providing the input unit showing the mode of the camera 25 in the lens unit 1, the camera 25 can prohibit the focus lens to be driven by the lens unit 1 so as to follow the reproducing image during reproducing.

According to at least one exemplary embodiment, the input unit has a dedicated switching unit; alternatively, the lens can have an automatic/manually focal point adjusting function, an input system serving as an automatically/manually switching unit may be provided. That is, when camera 25 is in the reproducing mode, a manually operated focal point adjustment may be adopted.

At Least a Fifth Exemplary Embodiment

At least a fifth exemplary embodiment of a lens apparatus is operatively connected (e.g. arranged detachably) with a camera apparatus including an image inputting unit for inputting an image signal; a sharpness evaluation value producing unit for producing the sharpness evaluation value 1110 showing the image sharpness from the image signal received by the image inputting unit; a focus lens drive signal producing unit for producing a focus lens drive signal by comparing the sharpness evaluation values 1110 produced from the sharpness evaluation value producing unit; and a focus lens driver for driving a focus lens using the focus lens drive signal outputted from focus lens drive signal producing unit, there can be a synchronizing-signal extraction unit for extracting a horizontally or vertically synchronizing signal from the image signal entered from an image producing unit; a reference timing generating unit for generating a reference timing; a synchronizing-signal quality determination unit for determining the quality of the synchronizing signal extracted by the synchronizing-signal extraction unit using the reference timing generated from the reference timing generating unit; and a drive prohibiting/permitting unit where when the synchronizing-signal quality determination unit determines the quality to be high, the camera can be determined to be in an image capturing mode. The image capturing mode permits the focus lens drive signal produced from the focus lens drive signal producing unit to enter the focus lens driver. When the quality is determined to be low, the camera can be determined to be in an image reproducing mode so as to prohibit the focus lens drive signal produced from the focus lens drive signal producing unit to enter the focus lens driver.

Figure 6:
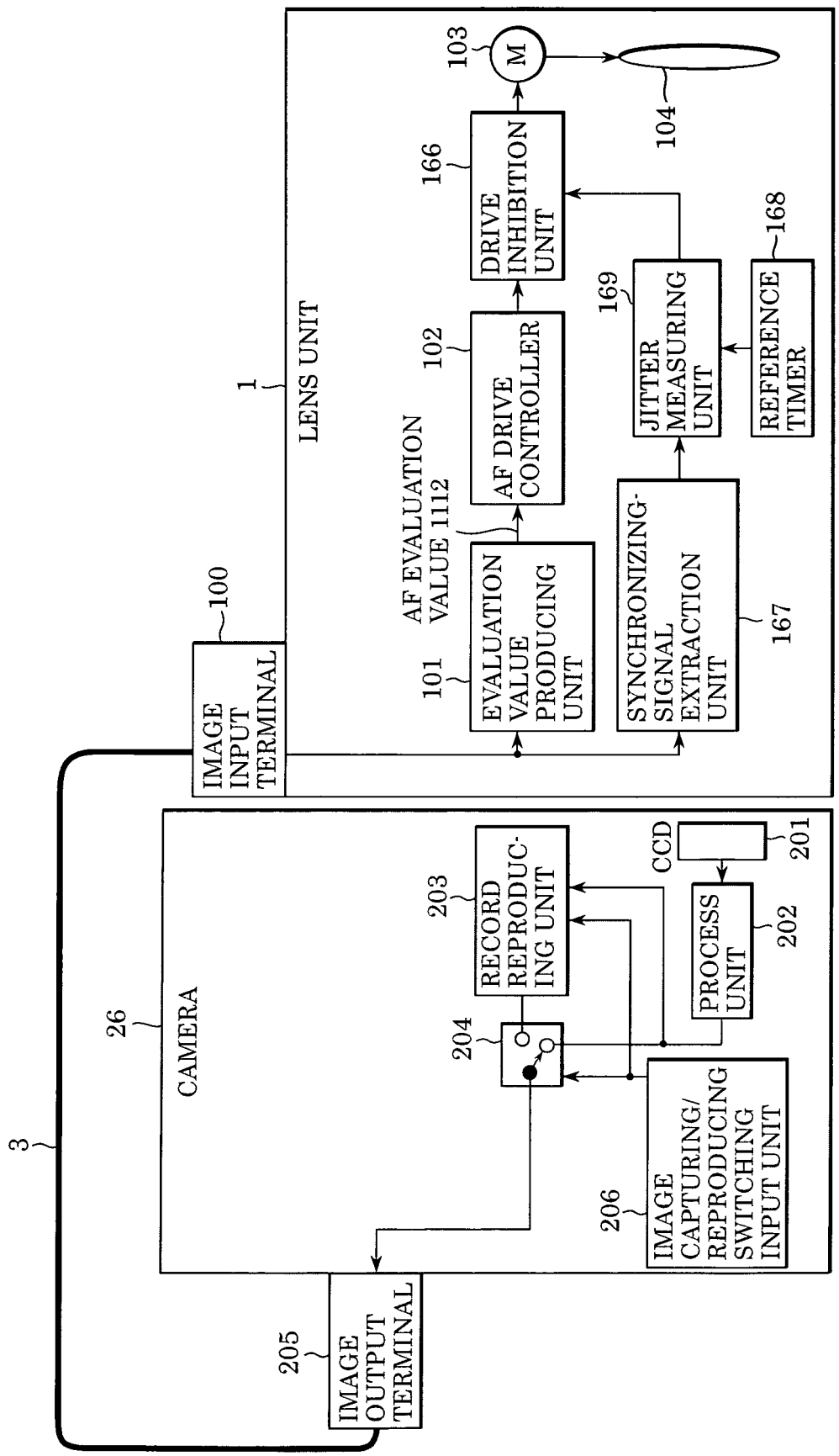
FIG. 6 illustrates a block diagram of a lens apparatus according to at least one additional exemplary embodiment.

FIG. 6 illustrates a block diagram of a lens apparatus according to at least one exemplary embodiment.

Referring to FIG. 6, like reference numerals designate like components common to those of the first exemplary embodiment, and the description about the same operations can be omitted.

At least one exemplary embodiment determines the mode of the camera 26 without establishing the lens unit 1 by a user.

Referring to FIG. 6, a synchronizing-signal extraction unit 167 can extract a horizontally or vertically synchronizing signal from the image signal entered from the image input terminal 100. A reference timer 168 can be composed of a high-accuracy transmitter. A jitter measuring unit 169 can measure a jittered amount of a synchronizing signal from the synchronizing signal produced from the synchronizing-signal extraction unit 167 and the timing signal with a predetermined time cycle outputted from the reference timer 168 so as to determine a jittered level and feed the result to the drive inhibiting unit 166.

When the camera 26 is in an image capturing mode, the process unit 202 produces a synchronizing signal using a reference clock such as a high-accuracy transmitter so as to be added to the output signal of the CCD 201. On the other hand, when the camera 26 is in an image reproducing mode, since the reference timing can be produced from tracking information of a recording medium, the fluctuation (jitter) of synchronizing signals can be larger in comparison with that in the image capturing mode.

In the lens unit 1, the jitter amount of the synchronizing signal extracted in the synchronizing-signal extraction unit 167 can be measured by the jitter measuring unit 169 so as to determine it into two levels of the larger jitter (reproducing mode) and the smaller jitter (recording mode) for feeding the determined result to the drive inhibiting unit 166. The jitter measuring unit 169 includes a counter so as to count the cycle of synchronizing signals using the timing signal produced from the reference timer 168 as a clock and using the synchronizing signal as a counter clear signal.

Then, the determination can be made with a threshold value predetermined relative to the fluctuation of discrete values. According to the determined result, if the fluctuation is smaller than the threshold value, the drive inhibiting unit 166 determines the camera 26 in the capturing mode so as to control the motor 103 according to the output of the AF drive controller 102, and if the fluctuation is larger than the threshold value, the drive inhibiting unit 166 determines the camera 26 in the reproducing mode so as to stop the motor 103.

According to at least one exemplary embodiment, the lens in the reproducing mode can be inhibited to drive without a user setting.

At Least a Sixth Exemplary Embodiment

At least a sixth exemplary embodiment of a lens apparatus is operatively connected (e.g. arranged detachably) with a camera apparatus including: an image inputting unit for inputting an image signal; a sharpness evaluation value 1110 producing unit for producing the sharpness evaluation value 1110 showing the image sharpness from the image signal received by the image inputting unit; a focus lens drive signal producing unit for producing a focus lens drive signal by comparing the sharpness evaluation values 1110 produced from the sharpness evaluation value producing unit; and a focus lens driver for driving a focus lens using the focus lens drive signal outputted from the focus lens drive signal producing unit, there can be a camera mode determination unit for determining the correlation between the sharpness evaluation value 110 and position information by inputting the sharpness evaluation value 1110 outputted from the sharpness evaluation value producing unit and the position information of the focus lens obtained from the focus lens drive signal producing unit; and a drive prohibiting/permitting unit in that when the camera mode determination unit determines the correlation to be high, the camera is determined to be in an image capturing mode so as to permit the focus lens drive signal produced from the focus lens drive signal producing unit to enter the focus lens driver, and when determining the correlation to be low, the camera is determined to be in an image reproducing mode so as to prohibit the focus lens drive signal produced from the focus lens drive signal producing unit to enter the focus lens driver.

Figure 7:
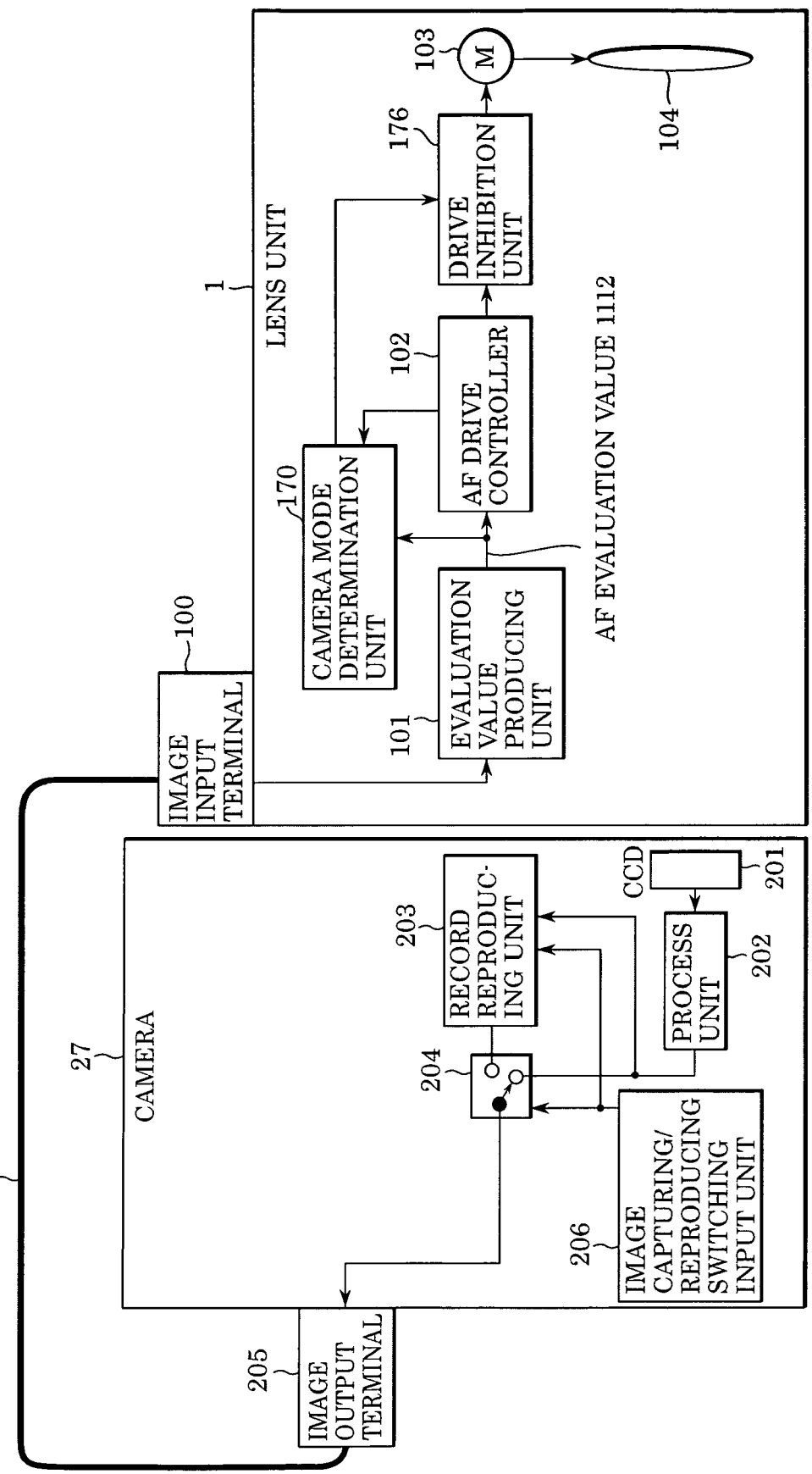
FIG. 7 illustrates a block diagram of a lens apparatus according at least one additional exemplary embodiment.

FIG. 7 illustrates a block diagram of a lens apparatus according to at least one exemplary embodiment.

Referring to FIG. 7, like reference numerals designate like components common to those of the first exemplary embodiment, and the description about the same operations can be omitted.

At least one exemplary embodiment determines the mode of the camera 27 using a sharpness evaluation value 1110.

Referring to FIG. 7, a camera mode determination unit 170 determines the mode of the camera 27 by inputting the sharpness evaluation value 1110 outputted from the evaluation value producing unit 101 and the position information of the focus lens recognized in the AF drive controller 102 so as to feed its result to the drive inhibiting unit 176.

The camera mode determination unit 110 prohibits the AF drive controller 102 to produce a control signal to the drive inhibiting unit 176 under a predetermined condition produced by inputting the sharpness evaluation value 1110 (AF evaluation value) outputted from the evaluation value producing unit 101, while feeding the motor control signal produced in the camera mode determination unit 170 to the motor 103.

Sequential operations of the lens apparatus according to at least one exemplary embodiment will be described with reference to the graph of the sharpness evaluation values 1110 in FIG. 8 and the flowchart in FIG. 9.

Figure 9:
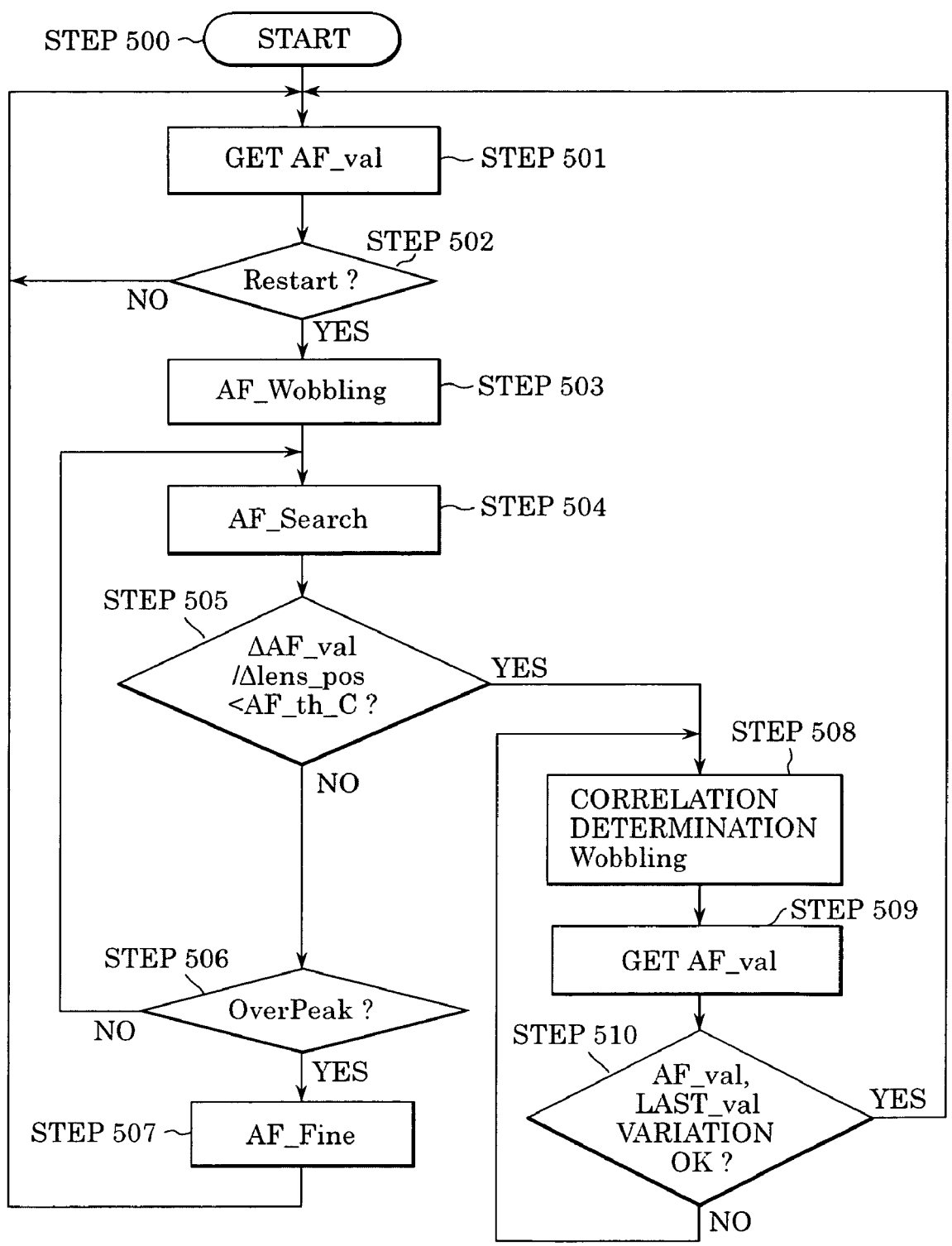
FIG. 9 illustrates a flowchart showing the operation of the lens apparatus according to the exemplary embodiment shown in FIG. 7.

The AF drive controller 102 having the received (step 502 in FIG. 9) sharpness evaluation value 1110 can determine whether the AF operation is being executed or not (step 502 in FIG. 9). The determination of whether the lens unit is in a focused state can be made by comparing the present sharpness evaluation value 1110 with the prior one. When in the focused state, the mode can be on standby for inputting the sharpness evaluation value 1110 inputted at the next vertically synchronizing timing waiting for restarting of the AF operation.

On the other hand, when determined not in the focused state, the AF operation can be restarted. That is, it can be determined whether the in-focus point is located at a position remote from or close to the present position of the focus lens by changes in sharpness evaluation value 1110 when the focus lens is slightly moved. The moving direction of the focus lens can be determined to be a direction along which the sharpness evaluation value 1110 increases by comparing the corresponding sharpness evaluation value 1110 with the value before the focus lens is slightly moved (step 503 of FIG. 9 and t1 of FIG. 8). This operation can be referred to as Wobbling operation.

After the moving direction is detected by the Wobbling operation, in order to detect the peak value of the sharpness evaluation, the focus lens can be moved (step 504 of FIG. 9). After the peak value is passed (step 506 of FIG. 9 and t1 and t2 of FIG. 8), the focus lens is determined to have passed through the in-focus point, so that the focus lens is moved in very small increments in the reverse direction so as to increase the sharpness evaluation value 1110 (step 507 of FIG. 9 and t2 and t3 of FIG. 8).

Figure 8:
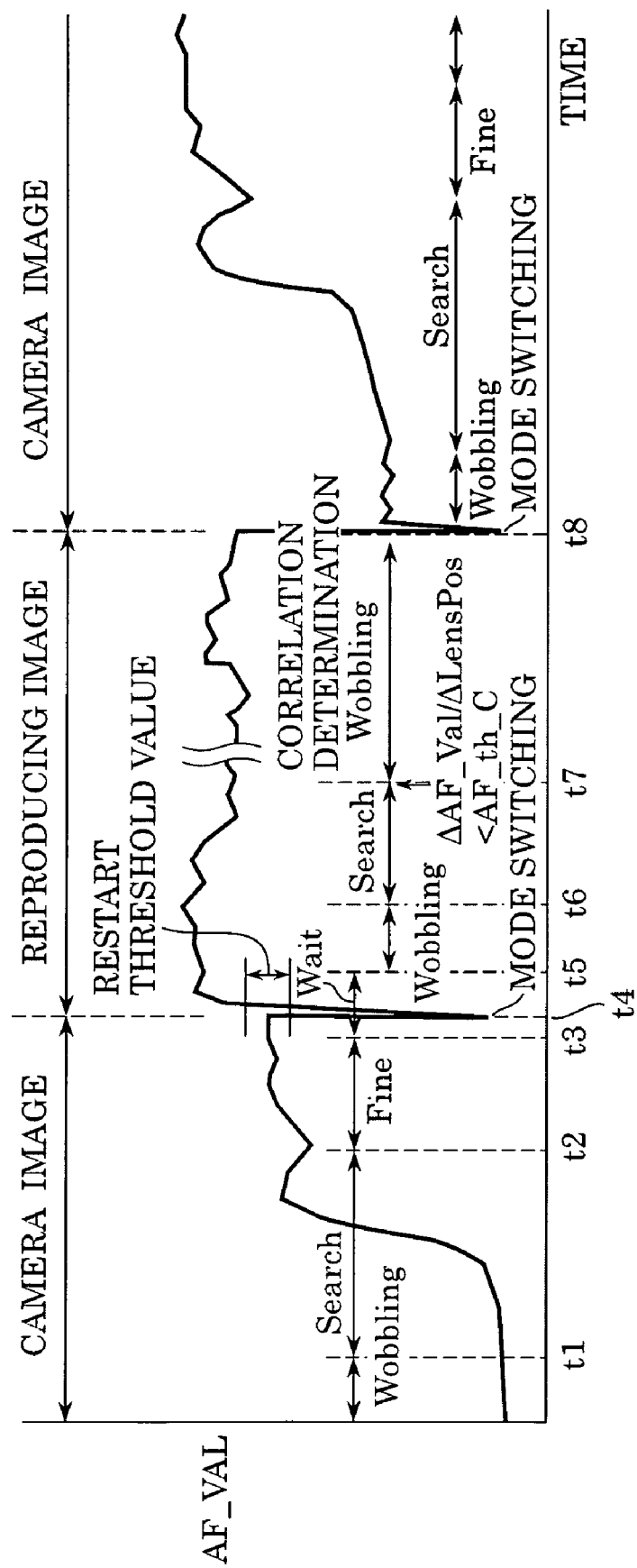
FIG. 8 illustrates a graph showing a shift of sharpness evaluation values related to the exemplary embodiment illustrated in FIG. 7.

Upon completion of this operation, the AF operation can be completed so as to become the standby mode for restarting until when the sharpness evaluation value 1110 can be largely changed (steps 501 and 502 of FIG. 9 and t3 and t4 of FIG. 8). The change process during this operation can be schematically shown in a "camera image" region on the left side of FIG. 8.

If the camera 27 is switched to the reproducing mode from the standby for restarting, the sharpness evaluation value 1110 produced in the evaluation value producing unit 101 does not depend on the position shown by the reproducing image region of FIG. 8. The sharpness evaluation value 1110 can be impacted by instantaneous disturbance of images (t4 of FIG. 8) during image capturing/reproducing switching, and since the restart condition generally includes components in order of time, the AF operation is not restarted. However, because the level of the sharpness evaluation value 1110 changes over for a predetermined time due to the reproducing image, the restart condition can be satisfied so that the AF operation can be started (t5 of FIG. 8). In the camera mode determination unit 170, after the direction determination by Wobbling, during lens driving (step 504 of FIG. 9 and t6 of FIG. 8), lens position information can be compared with variation of the sharpness evaluation value 1110 (step 505 of FIG. 9 and t6 and t7 of FIG. 8). When no correlation is detected, it is determined that the camera 27 is in the reproducing mode, so that the camera 27 is in the standby mode for image capturing (t7 of FIG. 8). In this mode, the camera mode determination unit 170 produces the control signal of Wobbling for correlation determination. Furthermore, to the drive inhibiting unit 176, a signal prohibiting to drive the focus motor 103 can be fed from the AF drive controller 102. To the focus motor 103, the control signal of Wobbling for correlation determination can be fed (step 508 of FIG. 9).

The Wobbling for correlation determination can be a drive system for intermittently displacing the focus lens by a very slight distance different from the conventional Wobbling for direction determination. The focus lens can be displaced to the position remote from or close to the present focus position at a long cycle such as one second, so that it can be determined whether variation of the sharpness evaluation value 1110 corresponds to the driving of Wobbling for correlation determination (step 510 of FIG. 9).

When Wobbling for correlation determination is not correlated with variation of the sharpness evaluation value 1110, this operation can be repeated (steps 508 to 510 of FIG. 9 and t7 and t8 of FIG. 8). When the correlation can be confirmed, the camera 27 can be determined to be in the image capturing mode, and can be reversed to the standby mode for AF restarting (step 501 of FIG. 9 and t8 of FIG. 8). Furthermore, to the camera mode determination unit 170, a signal to drive the focus motor 103 can be fed from the AF drive controller 102.

Then, the normal AF operation can be started so as to become focusing through the change process in the sharpness evaluation value 1110 as shown in "camera image" region on the right of FIG. 8.

According to such a structure, the image capturing/reproducing mode of the camera 27 can be automatically determined without a reference timing generating circuit.

According to at least one exemplary embodiment, when the mode is changed from capturing to reproducing, the correlation between the lens position and the sharpness evaluation value 1110 can be determined by comparing the rate of the respective differences with a predetermined threshold value (AF_th_C) (step 505 of FIG. 9). However, since there can be various determining methods, the methods in accordance with exemplary embodiments; should not be limited to only the methods described herein but should include equivalent methods and methods as known by one of ordinary skill. At least one exemplary embodiment uses the focus lens position and the sharpness evaluation value 1110 in a determination method.

It may also be determined that the mode can be changed to reproducing mode when the lens arrives at both the telescopic and wide angle ends before focusing by monitoring focus lens position information. Additionally, at least one exemplary embodiment can use the above-mentioned image disturbance generated during image capturing/reproducing switching of the camera 27.

At Least a Seventh Exemplary Embodiment

Figure 11:
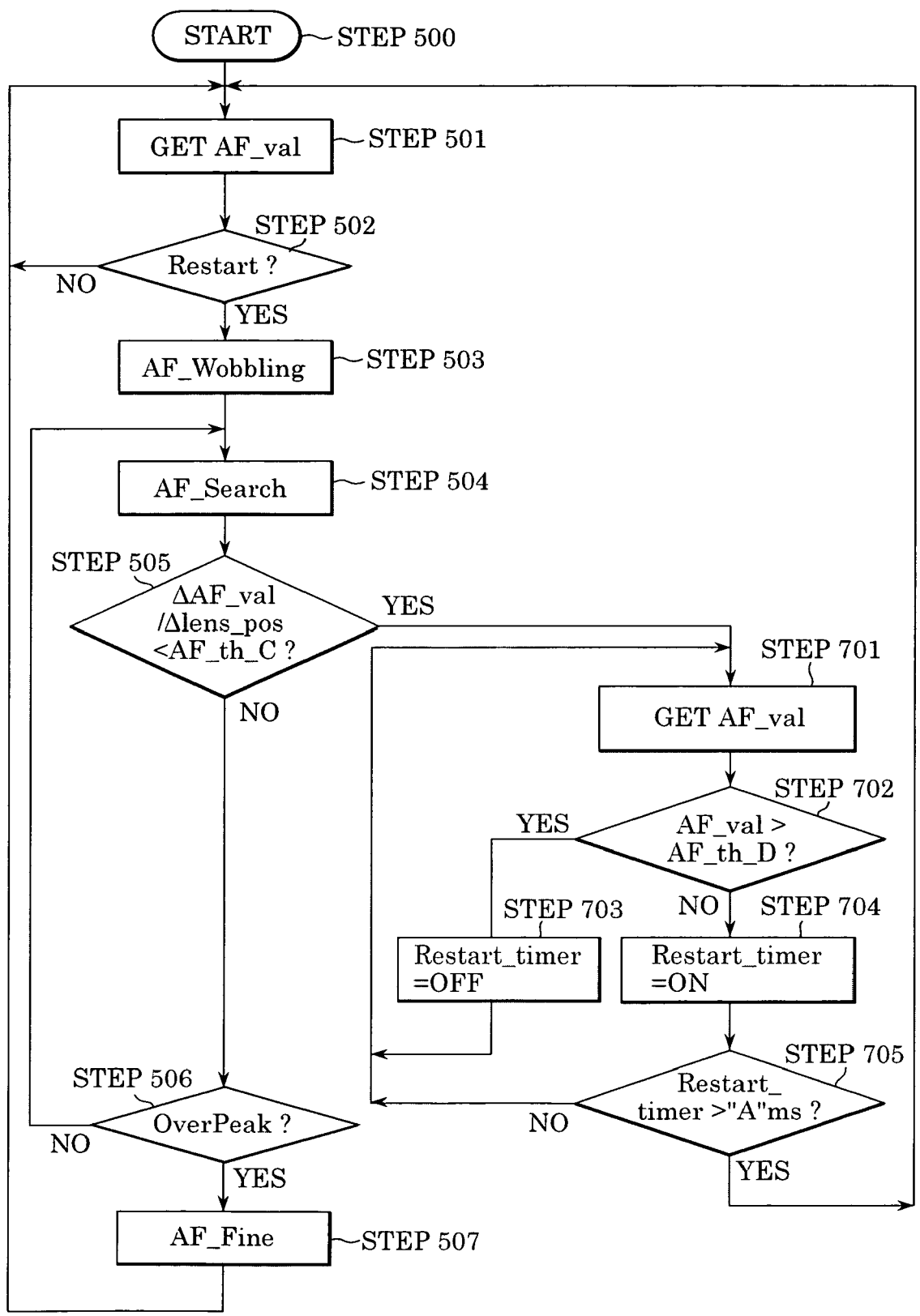
FIG. 11 illustrates a flowchart showing the operation of the lens apparatus related to the exemplary embodiment illustrated in FIG. 10.

A lens apparatus according to at least one exemplary embodiment can be illustrated in the description of a seventh exemplary embodiment as illustrated by FIG. 11. FIG. 11 illustrates an operational flowchart of a lens apparatus according to at least one exemplary embodiment. According to the exemplary embodiment, like reference numerals designate like components common to those of the exemplary embodiments described above, and the description about the same operations can be omitted.

At least one exemplary embodiment determines the mode change of the camera 27 from reproducing to recording without driving the focus lens.

The present exemplary embodiment will be described with reference to the graph of the sharpness evaluation value 1110 in FIG. 10, the flowchart in FIG. 11, and the block diagram of FIG. 7 according to the sixth exemplary embodiment.

Figure 10:
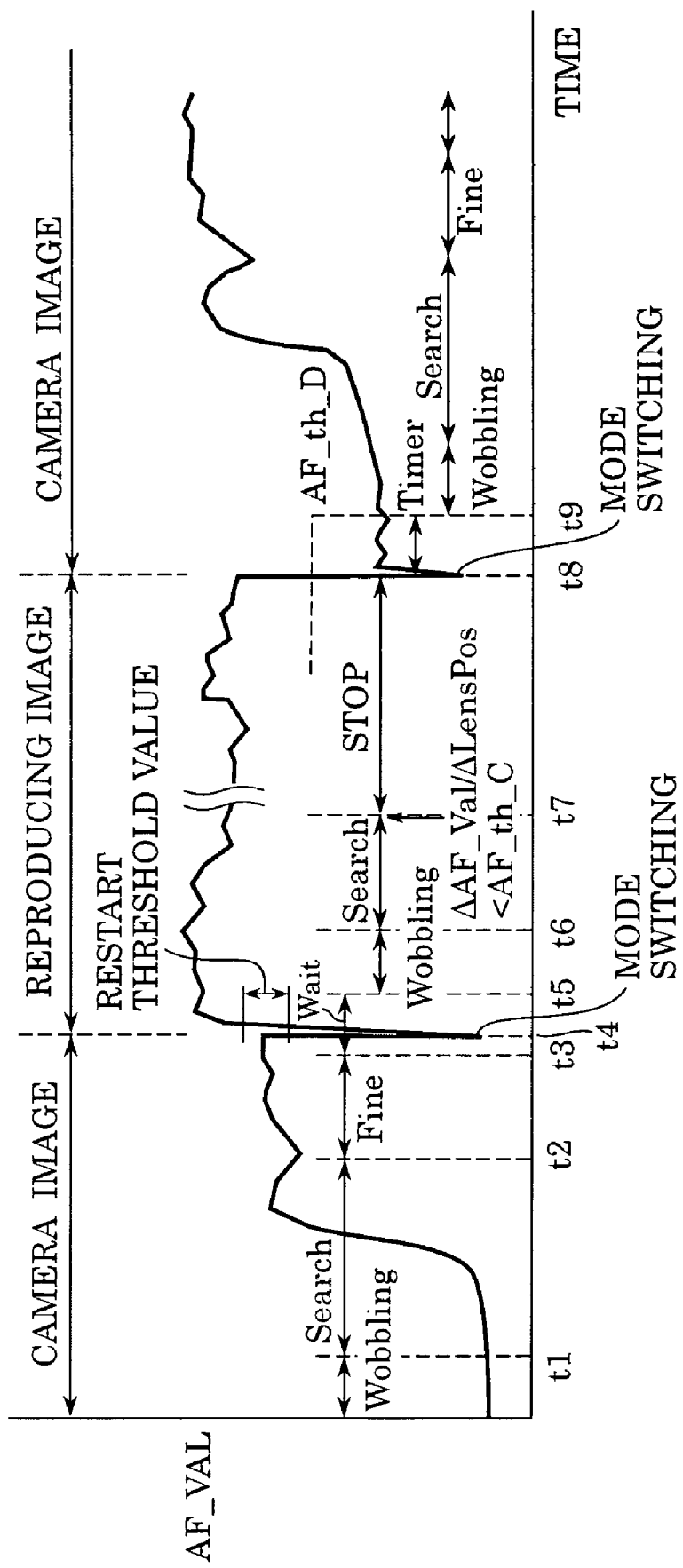
FIG. 10 illustrates a graph showing a shift of sharpness evaluation values according to at least one additional exemplary embodiment.

After a restart condition is established in "reproducing image" region of FIG. 10 (step 502 of FIG. 11 and t4 of FIG. 10), the moving direction can be detected by the Wobbling operation (step 503 of FIG. 11 and t5 of FIG. 10), and the focus lens can be driven to detect the peak value of the sharpness evaluation value 1110 (step 504 of FIG. 11 and t6 and t7 of FIG. 10). Then, the camera mode determination unit 170 determines whether the camera 27 changes in mode from the image capturing to the image reproducing mode by comparing the focus lens position with the sharpness evaluation value 1110 (step 505 of FIG. 11 and t7 of FIG. 10).

Then, when the camera 27 is determined to change to the reproducing mode (t7 of FIG. 10), the camera mode determination unit 170 commands the drive inhibiting unit 176 to inhibit feeding a motor drive control signal to the focus motor 103 from the AF drive controller 102 so as to stop the focus motor 103. Then, the sequentially entered sharpness evaluation values 1110 (step 701 of FIG. 11) can be determined with a predetermined threshold value "AF_th_D" (step 702 of FIG. 11 and t8 of FIG. 10). When the sharpness evaluation value 1110 has a value that is the threshold value "AF_th_D" or less, the sharpness evaluation value 1110 is maintained for a predetermined period of time (steps 703, 704, and 705 of FIG. 11 and t8 and t9 of FIG. 10), the camera 27 can be determined to return to the image capturing mode by starting the timer after the sharpness evaluation value 1110 is reduced less than the threshold value "AF_th_D" so as to transfer it to the restart determination (steps 501 and 502 of FIG. 11). The threshold value "AF_th_D" herein can be directly compared with the sharpness evaluation value 1110; alternatively, the threshold value may be a threshold value of the difference to the preceding sharpness evaluation value 1110. Before the determination can be transferred to the restart determination (steps 501 and 502 of FIG. 11), the normal AF processing may be executed after the correlation can be confirmed by starting the Wobbling for determining correlation described in the sixth exemplary embodiment.

In accordance with at least one exemplary embodiment, the mode of the camera 27 can be automatically determined substantially without driving the focus lens in the lens unit 1.

At Least an Eighth Exemplary Embodiment

Figure 12:
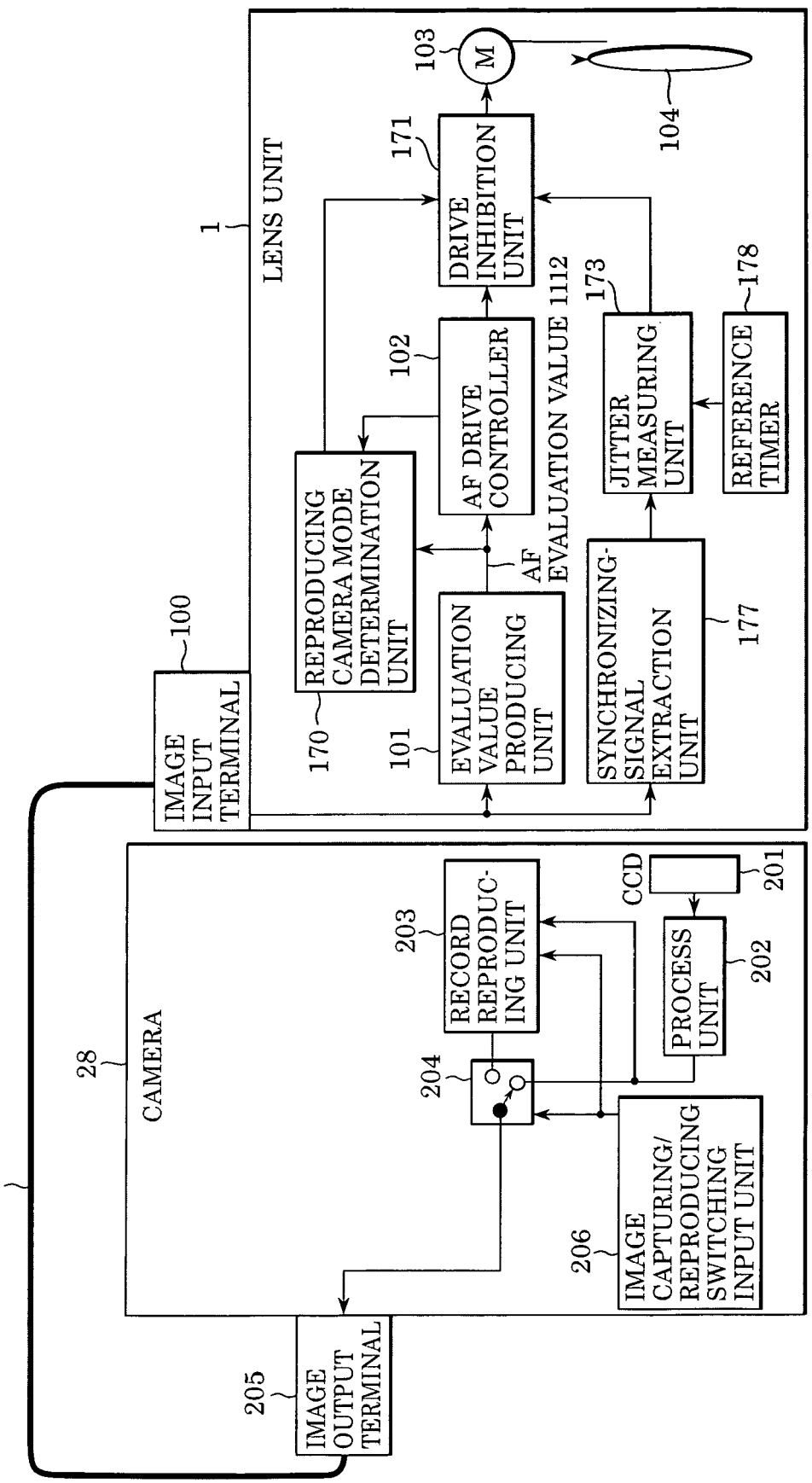
FIG. 12 illustrates a block diagram of a lens apparatus according to at least one additional exemplary embodiment.

A lens apparatus according to at least one exemplary embodiment is illustrated in FIG. 12 and is incorporated in an eighth example of an exemplary embodiment. FIG. 12 shows a block diagram illustrating the structure of a lens apparatus according to the exemplary embodiment. Referring to FIG. 12, like reference numerals designate like components common to those of the embodiments described above, and the description about the same operations can be omitted.

At least one exemplary embodiment determines the mode of the camera 28 by the jitter measurement of a synchronizing signal according to the fifth exemplary embodiment and the mode determination of the focus lens position and the sharpness evaluation value 1110 according to the seventh exemplary embodiment.

According to the exemplary embodiment, in the drive inhibiting unit 171, results of the camera mode determination unit 170 and the jitter measuring unit 173 can be entered. When the results of the camera mode determination unit 170 and the jitter measuring unit 173 show the image reproducing mode, the camera 28 is determined to be in the image reproducing mode. When one of the results of the camera mode determination unit 170 and the jitter measuring unit 173 shows the image capturing mode, the camera 28 is determined to be in the image capturing mode.

In accordance with at least one exemplary embodiment, the error determination can be suppressed in that the image reproducing mode can be wrongly determined from the lens unit 1 even when the camera 28 is in the image capturing mode.

At Least a Ninth Exemplary Embodiment

Figure 13:
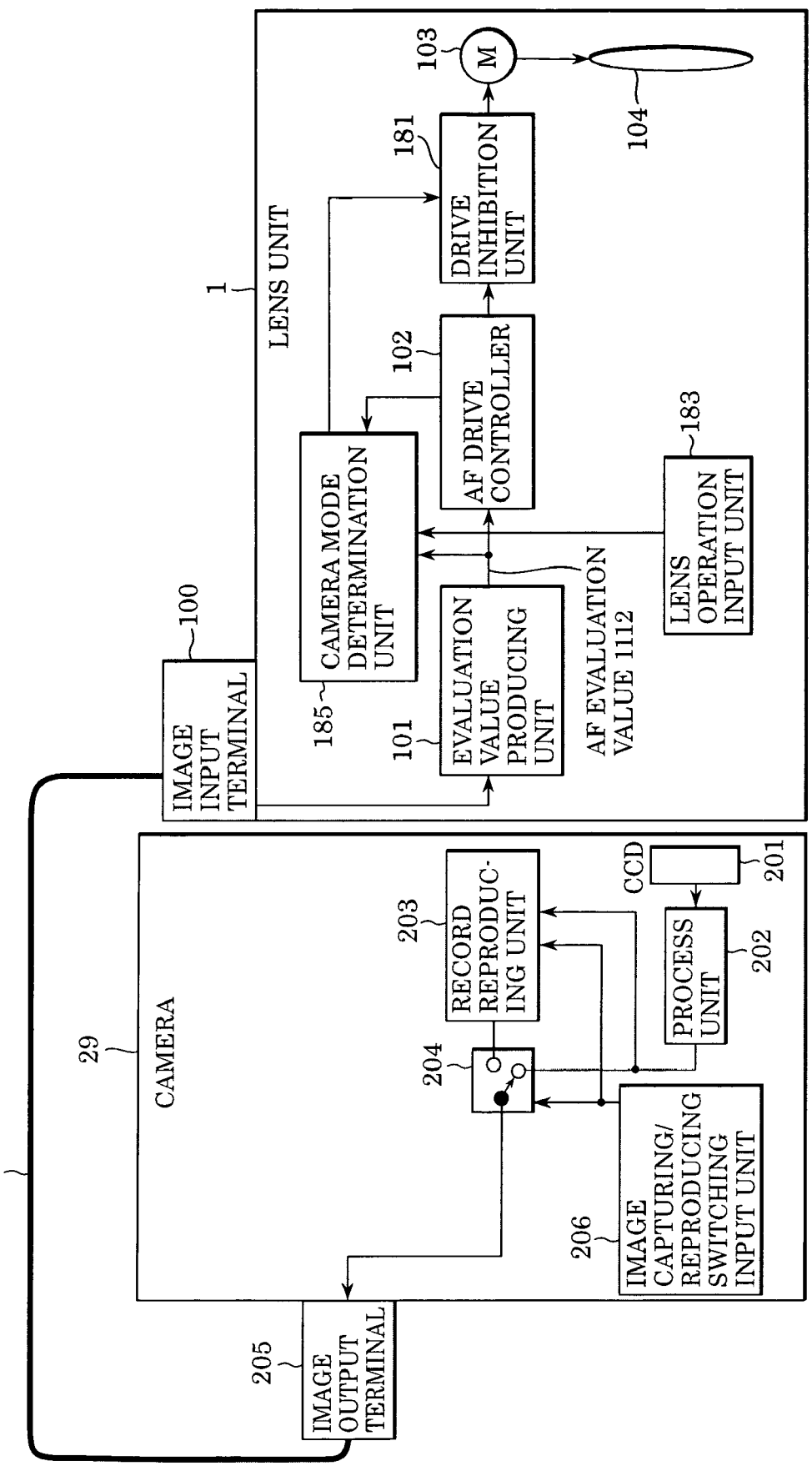
FIG. 13 illustrates a block diagram of a lens apparatus according to at least one additional exemplary embodiment.
Figure 14:
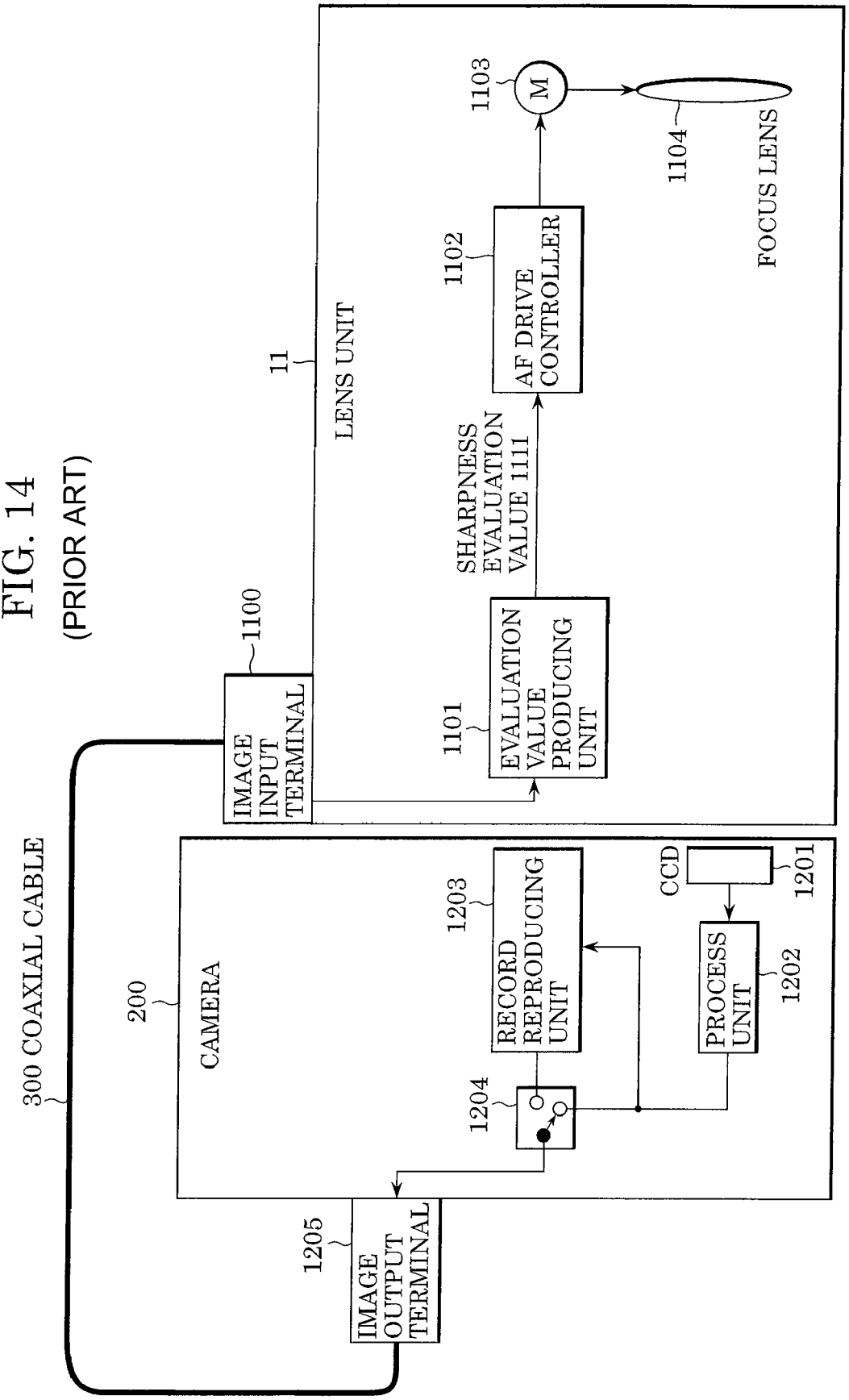
FIG. 14 illustrates a block diagram of a conventional lens apparatus.
Figure 15:
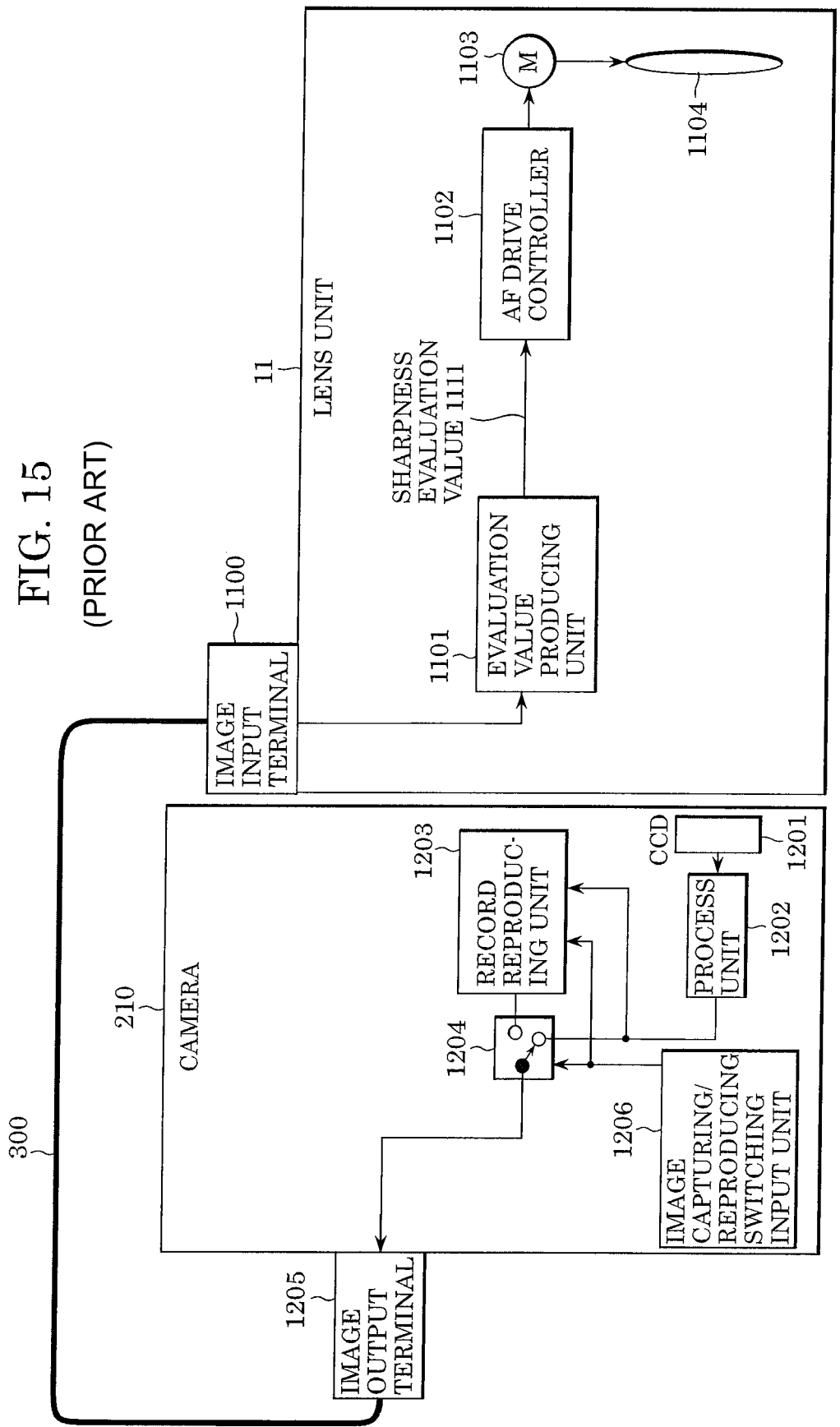
FIG. 15 illustrates a block diagram of a conventional lens apparatus.

A lens apparatus according to at least one exemplary embodiment can be incorporated in a ninth example of an exemplary embodiment. FIG. 13 illustrates a block diagram of a lens apparatus according to the exemplary embodiment. Referring to FIG. 13, like reference numerals designate like components common to those of the embodiments described above, and the description about the same operations can be omitted.

At least one exemplary embodiment determines that the mode of the camera 29 changes from the image reproducing mode to the image capturing mode by operating an operation member.

Referring to FIG. 13, reference numeral 183 denotes a lens operation input unit such as an automatically/manually operated select switch for a zoom ring and an iris.

The camera mode determination unit 185 monitors the inputting variation of the lens operation input unit 183 when the camera mode determination unit 185 determines the mode of the camera 29 to be in the image reproducing mode. When the inputting is changed, the camera mode determination unit 185 determines that the camera 29 becomes the image capturing mode so as to restart the AF operation.

According to such a structure, the error determination can be suppressed in that the image reproducing mode can be wrongly determined from the lens unit 1 even when the camera 29 is in the image capturing mode. In at least one exemplary embodiment a drive inhibition unit 181 receives a signal from the camera mode determination unit 185 to inhibit the motor 103.

While at least one exemplary embodiment has been described herein, it is to be understood that the invention is not limited to the disclosed exemplary embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-170667 filed Jun. 9, 2004, which is hereby incorporated herein in its entirety.

What is claimed is:

1. A lens apparatus arranged detachably with a camera apparatus, the lens apparatus comprising:
   a focus lens;
   an evaluation value producing unit configured to produce an evaluation value for detecting an autofocus point using the image signal produced from the camera apparatus;
   a focus lens drive signal producing unit configured to produce a focus lens drive signal using the evaluation value produced from the evaluation value producing unit;
   a focus lens driver driving the focus lens on the basis of the focus lens drive signal;
   a controller configured to permit the focus lens drive signal to enter the focus lens driver when the camera apparatus is in an image capturing mode, while the controller is configured to inhibit the focus lens drive signal from entering the focus lens driver when the camera apparatus is in an image reproducing mode; and
   a camera mode determination unit configured to determine whether the camera apparatus is in the image capturing mode or in the image reproducing mode, the camera mode determination unit including a correlation determination unit configured to determine the correlation between the evaluation value and position information by inputting the evaluation value outputted from the evaluation value producing unit and the position information of the focus lens obtained from the focus lens drive signal producing unit,
   wherein when the correlation determination unit determines the correlation to be high, the camera apparatus is determined to be in the image capturing mode, and when determining the correlation to be low, the camera apparatus is determined to be in the image reproducing mode.

2. The apparatus according to claim 1, further comprising an inputting unit, wherein the inputting unit is configured for establishing the camera apparatus in one of the modes of image capturing and image reproducing.

3. The apparatus according to claim 1,
   wherein the camera mode determination unit includes:
   a synchronizing-signal extraction unit configured to extract a horizontally or vertically synchronizing signal from the image signal received from an image producing unit;
   a reference timing generating unit configured to generate a reference timing; and
   a synchronizing-signal quality determination unit configured to determine the quality of a synchronizing signal extracted by the synchronizing-signal extraction unit using the reference timing, and
   wherein when the synchronizing-signal quality determination unit determines the quality to be high, the camera apparatus is determined to be in the image capturing mode, and when determining the quality to be low, the camera apparatus is determined to be in the image reproducing mode.

4. The apparatus according to claim 1, wherein the focus lens drive signal producing unit includes:
   a focus lens stop signal generating unit configured to stop the movement of the focus lens when the focus lens reaches an in-focus point;
   an in-focus point information storing unit configured to store an in-focus point sharpness evaluation value at the in-focus point and in-focus point position information of the focus lens;
   a restart determination unit configured to determine the present evaluation value for detecting the autofocus point and the in-focus point sharpness evaluation value in comparison with a restart threshold value;
   an autofocus restarting unit configured to restart an autofocus processing according to the determined result of the restart determination unit;
   a restart initial value storing unit configured to store a restart initial sharpness evaluation value before the focus lens is driven when the restart determination unit is operated and the focus lens is moved by the focus lens driver;
   a sharpness evaluation value variation calculating unit configured to calculate the amount of change between the restart initial sharpness evaluation value stored in the restart initial value storing unit and the evaluation value for detecting the autofocus point;
   a focus lens position variation calculating unit configured to calculate the amount of change between the in-focus point position information stored in the in-focus point information storing unit and the present focus lens position information; and
   an evaluation value/lens position correlation determining unit configured to determine the correlation between the results of the sharpness evaluation value variation calculating unit and the focus lens position variation calculating unit,
   wherein the focus lens drive signal is controlled based on the result of the evaluation value/lens position correlation determining unit.

5. The apparatus according to claim 1, wherein the focus lens drive signal producing unit includes:
   a focus lens stop signal generating unit configured to stop the focus lens when the focus lens reaches an in-focus point;
   an in-focus point information storing unit configured to store an in-focus point sharpness evaluation value at the in-focus point and in-focus point position information of the focus lens;
   a restart determination unit configured to determine the present evaluation value for detecting the autofocus point and the in-focus point sharpness evaluation value with a restart threshold value;
   an autofocus restarting unit configured to restart an autofocus processing according to the determined result of the restart determination unit;
   a lens cycle change unit configured to periodically change the focus lens position by the controller when it is determined from the result of a camera mode determination unit that the mode of the camera body is changed from the image capturing to the image reproducing;
   a correlation confirmed information storing unit configured to store the position information of the focus lens and the sharpness evaluation value;
   a periodical evaluation value/lens position correlation determining unit configured to determine the correlation between the sharpness evaluation value stored in the correlation confirmed information storing unit, the position information of the focus lens, and the evaluation value for detecting the autofocus point,
   wherein when the high correlation is determined by the periodical evaluation value/lens position correlation determining unit, the autofocus restarting unit determines that the camera changes mode from the image reproducing to the image capturing so as to restart the autofocus processing.

6. The apparatus according to claim 5, wherein when the high correlation is determined by the periodical evaluation value/lens position correlation determining unit by driving the lens cycle change unit after the determined result of an image-capturing returning threshold value determines to restart the autofocus processing, the autofocus restarting unit determines that the mode of the camera apparatus changes from the image reproducing to the image capturing so as to restart the autofocus processing.

7. The apparatus according to claim 5, further comprising a camera mode determination unit configured to determine the mode of the camera apparatus to be in whether image capturing or image reproducing, the camera mode determination unit having a synchronizing-signal quality determination unit and a correlation determination unit so as to determine the camera mode to be in whether image capturing or image reproducing from the determined results from both the units.

8. The apparatus according to claim 5, further comprising:
   a lens operation inputting unit configured to be operated by a user; and
   a lens operation inputting determination unit configured to determine the presence of the inputting of the lens operation inputting unit,
   wherein when the lens operation inputting determination unit determines variation in the inputting by the lens operation inputting unit, the lens operation inputting determination unit determines that the mode of the camera apparatus changes from the image reproducing to the image capturing so as to restart the autofocus processing.

9. The apparatus according to claim 1, wherein the focus lens drive signal producing unit includes:
   a focus lens stop signal generating unit configured to stop the focus lens when the focus lens reaches an in-focus point;
   an in-focus point information storing unit configured to store an in-focus point sharpness evaluation value at the in-focus point and in-focus point position information of the focus lens;
   a restart determination unit configured to determine the present sharpness evaluation value and the in-focus point sharpness evaluation value with a restart threshold value; and
   an autofocus restarting unit configured to restart an autofocus processing by the restart determination unit that determines the evaluation value for detecting an autofocus point with an image-capturing returning threshold value when it is determined by the result of a camera mode determination unit that the mode of the camera apparatus is changed from the image capturing to the image reproducing.

10. The apparatus according to claim 9, further comprising:
    an evaluation value information storing unit configured to store an evaluation value for detecting the autofocus point;
    an evaluation value calculating unit configured to calculate the evaluation value stored in the evaluation value information storing unit and the present evaluation value for detecting the autofocus point; and
    an autofocus restarting unit configured to restart an autofocus processing by the restart determination unit that determines the result of the evaluation value calculating unit with an image-capturing returning threshold value.

11. The apparatus according to claim 9, wherein when the high correlation is determined by the periodical evaluation value/lens position correlation determining unit by driving the lens cycle change unit after the determined result of the image-capturing returning threshold value determines to restart the autofocus processing, the autofocus restarting unit determines that the mode of the camera apparatus changes from the image reproducing to the image capturing so as to restart the autofocus processing.

12. The apparatus according to claim 9, further comprising a lens position displacement unit configured to detect the moving direction of the focus lens by displacing the focus lens during autofocus operation,
    wherein the lens position displacement unit displaces the focus lens independently from the cycle and the movement of a lens cycle change unit.

13. An image capturing apparatus comprising:
    the lens apparatus according to claim 1; and
    a camera apparatus configured to be mounted on the lens apparatus.

14. The lens apparatus of claim 1, wherein the focus lens drive signal is produced using the evaluation value produced from the evaluation value producing unit.

* * * * *